US011036049B2

(12) United States Patent
Baerenrodt et al.

(10) Patent No.: US 11,036,049 B2
(45) Date of Patent: Jun. 15, 2021

(54) SYSTEMS AND METHODS FOR MANIPULATING LIGHT FROM AMBIENT LIGHT SOURCES

(71) Applicant: Magic Leap, Inc., Plantation, FL (US)

(72) Inventors: Eric Baerenrodt, Milford, NH (US); Nastasja U. Robaina, Coconut Grove, FL (US); Nicole Elizabeth Samec, Ft. Lauderdale, FL (US); Christopher M. Harrises, Nashua, NH (US); Mark Baerenrodt, Delray Beach, FL (US)

(73) Assignee: Magic Leap, Inc., Plantation, FL (US)

( * ) Notice: Subject to any disclaimer, the term of this patent is extended or adjusted under 35 U.S.C. 154(b) by 49 days.

(21) Appl. No.: 15/850,465

(22) Filed: Dec. 21, 2017

(65) Prior Publication Data

US 2018/0180890 A1 Jun. 28, 2018

Related U.S. Application Data

(60) Provisional application No. 62/438,325, filed on Dec. 22, 2016.

(51) Int. Cl.
*G02B 27/00* (2006.01)
*G02B 27/01* (2006.01)
(Continued)

(52) U.S. Cl.
CPC ........... *G02B 27/0172* (2013.01); *G02B 3/14* (2013.01); *G02B 27/0081* (2013.01);
(Continued)

(58) Field of Classification Search
CPC .... G06F 1/1684; G06F 1/1694; G06F 1/3206; G06F 1/3215; G06F 3/011; G06F 3/013;
(Continued)

(56) References Cited

U.S. PATENT DOCUMENTS 5,781,330 A * 7/1998 Kolodner .................. G02F 1/15
359/273
6,850,221 B1 2/2005 Tickle
(Continued)

FOREIGN PATENT DOCUMENTS

WO WO 2015/109145 7/2015
WO WO 2018/119276 6/2018

OTHER PUBLICATIONS

International Search Report and Written Opinion for PCT Application No. PCT/US 17/67968, dated Mar. 14, 2018.
(Continued)

*Primary Examiner* — Hong Zhou
(74) *Attorney, Agent, or Firm* — Knobbe, Martens, Olson & Bear, LLP

(57) ABSTRACT

An optical device includes variable optical material that alters at least one of: incident ambient light, spectral content of incident ambient light or direction of incident ambient light through the optical device in response to a stimulus provided by the device. The device can sense intensity and/or spectral characteristics of ambient light and provide appropriate stimulus to various portions of the optical device to activate the variable optical material and alter at least one of: incident ambient light, spectral content of incident ambient light or direction of incident ambient light.

52 Claims, 14 Drawing Sheets

(51) Int. Cl.
*G02B 3/14* (2006.01)
*G02F 1/00* (2006.01)
*G02F 1/01* (2006.01)
*G02F 1/29* (2006.01)
*G06F 3/01* (2006.01)
*F21V 8/00* (2006.01)

(52) U.S. Cl.
CPC .......... *G02F 1/0018* (2013.01); *G02F 1/0128* (2013.01); *G02F 1/29* (2013.01); *G06F 3/013* (2013.01); *G02B 6/0076* (2013.01); *G02B 27/0179* (2013.01); *G02B 2027/014* (2013.01); *G06F 3/011* (2013.01)

(58) Field of Classification Search
CPC ..... G08B 21/24; H04W 4/80; Y02D 70/1222; Y02D 70/1262; Y02D 70/142; Y02D 70/144; Y02D 70/164; Y02D 70/166; G02B 2027/014; G02B 27/0081; G02B 27/0172; G02B 27/0179; G02B 3/14; G02B 6/0076; G02F 1/0018; G02F 1/0128; G02F 1/29
See application file for complete search history.

(56) References Cited

U.S. PATENT DOCUMENTS

| | | | |
|---|---|---|---|
| D514,570 S | 2/2006 | Ohta | |
| 7,970,172 B1* | 6/2011 | Hendrickson | B60J 3/04 |
| | | | 280/735 |
| 8,982,471 B1 | 3/2015 | Starner et al. | |
| 9,081,426 B2 | 7/2015 | Armstrong | |
| 9,215,293 B2 | 12/2015 | Miller | |
| D752,529 S | 3/2016 | Loretan et al. | |
| 9,348,143 B2 | 5/2016 | Gao et al. | |
| D759,657 S | 6/2016 | Kujawski et al. | |
| 9,417,452 B2 | 8/2016 | Schowengerdt et al. | |
| 9,470,906 B2 | 10/2016 | Kaji et al. | |
| 9,547,174 B2 | 1/2017 | Gao et al. | |
| 9,671,566 B2 | 6/2017 | Abovitz et al. | |
| D794,288 S | 8/2017 | Beers et al. | |
| 9,740,006 B2 | 8/2017 | Gao | |
| 9,791,700 B2 | 10/2017 | Schowengerdt et al. | |
| D805,734 S | 12/2017 | Fisher et al. | |
| 9,851,563 B2 | 12/2017 | Gao et al. | |
| 9,857,591 B2 | 1/2018 | Welch et al. | |
| 9,874,749 B2 | 1/2018 | Bradski | |
| 2006/0028436 A1 | 2/2006 | Armstrong | |
| 2007/0081123 A1 | 4/2007 | Lewis | |
| 2012/0113140 A1 | 5/2012 | Hilliges et al. | |
| 2012/0127062 A1 | 5/2012 | Bar-Zeev et al. | |
| 2012/0162549 A1 | 6/2012 | Gao et al. | |
| 2012/0212696 A1* | 8/2012 | Trajkovska | G02C 7/083 |
| | | | 349/123 |
| 2012/0218172 A1 | 8/2012 | Border et al. | |
| 2012/0235900 A1 | 9/2012 | Border et al. | |
| 2013/0082922 A1 | 4/2013 | Miller | |
| 2013/0113973 A1 | 5/2013 | Miao et al. | |
| 2013/0114043 A1 | 5/2013 | Balan et al. | |
| 2013/0117377 A1 | 5/2013 | Miller | |
| 2013/0125027 A1 | 5/2013 | Abovitz | |
| 2013/0201549 A1* | 8/2013 | Mori | G02F 1/167 |
| | | | 359/296 |
| 2013/0208014 A1 | 8/2013 | Fleck et al. | |
| 2013/0208234 A1 | 8/2013 | Lewis | |
| 2013/0240804 A1* | 9/2013 | Pagba | G02B 1/04 |
| | | | 252/586 |
| 2013/0242262 A1 | 9/2013 | Lewis | |
| 2014/0071539 A1 | 3/2014 | Gao | |
| 2014/0139551 A1 | 5/2014 | McCulloch et al. | |
| 2014/0177023 A1 | 6/2014 | Gao et al. | |
| 2014/0218468 A1 | 8/2014 | Gao et al. | |
| 2014/0267420 A1 | 9/2014 | Schowengerdt | |
| 2014/0306866 A1 | 10/2014 | Miller et al. | |
| 2014/0340286 A1* | 11/2014 | Machida | G02B 26/0833 |
| | | | 345/8 |
| 2015/0016777 A1 | 1/2015 | Abovitz et al. | |
| 2015/0103306 A1 | 4/2015 | Kaji et al. | |
| 2015/0178939 A1* | 6/2015 | Bradski | G02B 27/017 |
| | | | 345/633 |
| 2015/0205126 A1 | 7/2015 | Schowengerdt | |
| 2015/0222883 A1 | 8/2015 | Welch | |
| 2015/0222884 A1 | 8/2015 | Cheng | |
| 2015/0268415 A1 | 9/2015 | Schowengerdt et al. | |
| 2015/0302652 A1 | 10/2015 | Miller et al. | |
| 2015/0309263 A2 | 10/2015 | Abovitz et al. | |
| 2015/0326570 A1 | 11/2015 | Publicover et al. | |
| 2015/0346490 A1 | 12/2015 | TeKolste et al. | |
| 2015/0346495 A1 | 12/2015 | Welch et al. | |
| 2016/0011419 A1 | 1/2016 | Gao | |
| 2016/0026253 A1 | 1/2016 | Bradski et al. | |
| 2016/0055822 A1 | 2/2016 | Bell | |
| 2016/0216416 A1 | 7/2016 | TeKolste et al. | |
| 2018/0003966 A1* | 1/2018 | Kilcher | G02B 5/208 |
| 2018/0088323 A1* | 3/2018 | Bao | G01C 21/365 |

OTHER PUBLICATIONS

International Preliminary Report on Patentability for PCT Application No. PCT/US 17/67968, dated Jun. 25, 2019.

ARToolKit: https://web.archive.org/web/20051013062315/http://www.hitl.washington.edu:80/artoolkit/documentation/hardware.htm, archived Oct. 13, 2005.

Azuma, "A Survey of Augmented Reality," Teleoperators and Virtual Environments 6, 4 (Aug. 1997), pp. 355-385. https://web.archive.org/web/20010604100006/http://www.cs.unc.edu/—azuma/ARpresence.pdf.

Azuma, "Predictive Tracking for Augmented Realty," TR95-007, Department of Computer Science, UNC-Chapel Hill, NC, Feb. 1995.

Bimber, et al., "Spatial Augmented Reality—Merging Real and Virtual Worlds," 2005 https://web.media.mit.edu/~raskar/book/BimberRaskarAugmentedRealityBook.pdf.

Jacob, "Eye Tracking in Advanced Interface Design," Human-Computer Interaction Lab Naval Research Laboratory, Washington, D.C. / paper/ in Virtual Environments and Advanced Interface Design, ed. by W. Barfield and T.A. Furness, pp. 258-288, Oxford University Press, New York (1995).

Tanriverdi and Jacob, "Interacting With Eye Movements in Virtual Environments," Department of Electrical Engineering and Computer Science, Tufts University, Medford, MA—paper/Proc. ACM CHI 2000 Human Factors in Computing Systems Conference, pp. 265-272, Addison-Wesley/ACM Press (2000).

* cited by examiner

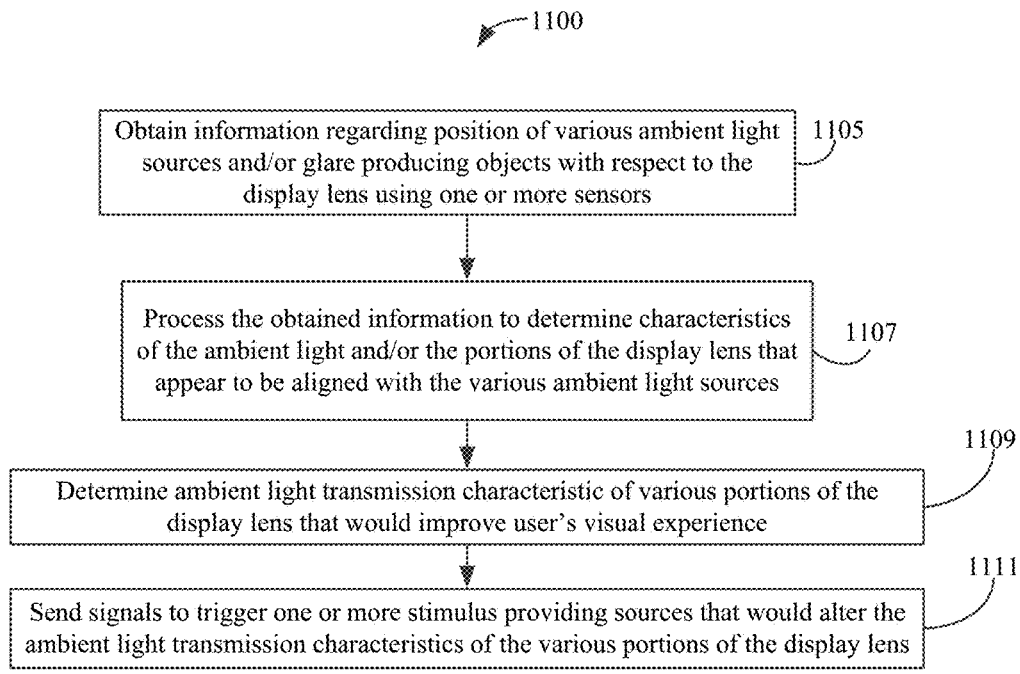
Figure 11
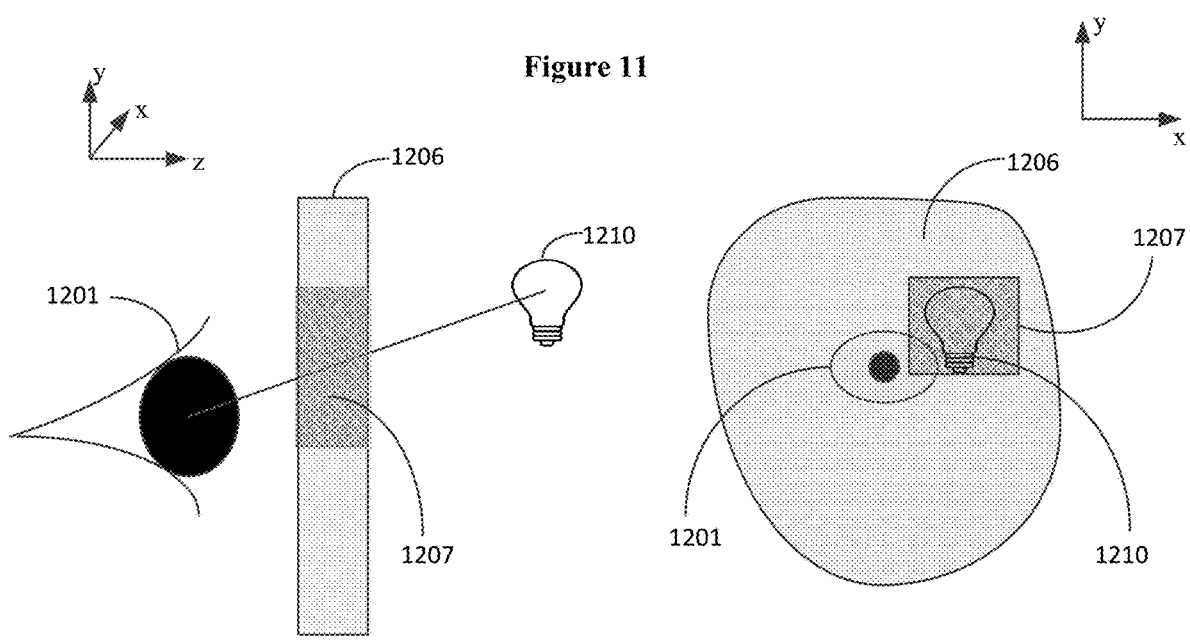
Figure 12A
Figure 12B

SYSTEMS AND METHODS FOR MANIPULATING LIGHT FROM AMBIENT LIGHT SOURCES

PRIORITY CLAIM

This application claims the priority benefit of U.S. Provisional Patent Application No. 62/438,325 filed on Dec. 22, 2016, which is incorporated by reference herein in its entirety.

INCORPORATION BY REFERENCE

This application is also related to U.S. patent application Ser. No. 15/841,043, filed on Dec. 13, 2017, which is incorporated by reference herein in its entirety.

BACKGROUND

Field

The present disclosure relates to optical devices, including virtual reality and augmented reality imaging and visualization systems.

Description of the Related Art

Modern computing and display technologies have facilitated the development of systems for so called "virtual reality" or "augmented reality" experiences, wherein digitally reproduced images or portions thereof are presented to a user in a manner wherein they seem to be, or may be perceived as, real. A virtual reality, or "VR", scenario typically involves presentation of digital or virtual image information without transparency to other actual real-world visual input; an augmented reality, or "AR", scenario typically involves presentation of digital or virtual image information as an augmentation to visualization of the actual world around the user. A mixed reality, or "MR", scenario is a type of AR scenario and typically involves virtual objects that are integrated into, and responsive to, the natural world. For example, in an MR scenario, AR image content may be blocked by or otherwise be perceived as interacting with objects in the real world.

Referring to FIG. 1, an augmented reality scene 10 is depicted wherein a user of an AR technology sees a real-world park-like setting 20 featuring people, trees, buildings in the background, and a concrete platform 30. In addition to these items, the user of the AR technology also perceives that he "sees" "virtual content" such as a robot statue 40 standing upon the real-world platform 30, and a cartoon-like avatar character 50 flying by which seems to be a personification of a bumble bee, even though these elements 40, 50 do not exist in the real world. Because the human visual perception system is complex, it is challenging to produce an AR technology that facilitates a comfortable, natural-feeling, rich presentation of virtual image elements amongst other virtual or real-world imagery elements.

Systems and methods disclosed herein address various challenges related to AR and VR technology.

SUMMARY

The systems, methods and devices of the disclosure each have several innovative aspects, no single one of which is solely responsible for the desirable attributes disclosed herein.

Details of one or more embodiments of the subject matter described in this specification are set forth in the accompanying drawings and the description below. Other features, aspects, and advantages will become apparent from the description, the drawings, and the claims. Note that the relative dimensions of the following figures may not be drawn to scale.

Various examples of optical devices comprising a variable optical material that undergoes a physical and/or a chemical change in response to a stimulus are described herein such as the examples enumerated below:

EXAMPLE 1

A user-wearable display device comprising: a frame configured to mount on the user; an augmented reality display attached to the frame and configured to direct images to an eye of the user; a sensor configured to obtain information about ambient light condition in an environment surrounding the user; a variable optical material that undergoes a physical and/or a chemical change in response to a stimulus; a source configured to provide the stimulus; and processing electronics configured to: trigger the source to provide the stimulus to the variable optical material to effect a physical and/or a chemical change in the material based on the information obtained by the sensor such that at least one of intensity of ambient light, spectral content of ambient light or direction of ambient light is changed.

EXAMPLE 2

The user-wearable device of Example 1, wherein the augmented reality display comprises a waveguide configured to: allow a view of the environment surrounding the user through the waveguide; and form images by directing light out of the waveguide and into an eye of the user.

EXAMPLE 3

The user-wearable device of Examples 1-2, wherein the waveguide is part of a stack of waveguides, wherein each waveguide of the stack is configured to output light with different amounts of divergence in comparison to one or more other waveguides of the stack of waveguides.

EXAMPLE 4

The user-wearable device of Examples 1-3, wherein the sensor comprises at least one of a light sensor, an image capture device, a global positioning sub-system, or an environmental sensor.

EXAMPLE 5

The user-wearable device of Examples 1-4, further comprising an image capture device configured to track movement of eyes of the user.

EXAMPLE 6

The user-wearable device of Examples 1-5, further comprising a light source configured to generate a projection beam based on data associated with the images directed to the eye of the user.

EXAMPLE 7

The user-wearable device of Examples 1-6, wherein the source comprises an optical source configured to direct visible or invisible light to one or more portions of the display.

EXAMPLE 8

The user-wearable device of Examples 1-6, wherein the source comprises an electrical source configured to provide an electrical signal to one or more portions of the display.

EXAMPLE 9

The user-wearable device of Examples 1-6, wherein the source comprises a thermal source configured to provide a thermal radiation to one or more portions of the display.

EXAMPLE 10

The user-wearable device of Examples 1-6, wherein the source comprises a sonic/ultrasonic system configured to provide sonic/ultrasonic energy to one or more portions of the display.

EXAMPLE 11

The user-wearable device of Examples 1-10, wherein the variable optical material is embedded in a surface of the display.

EXAMPLE 12

The user-wearable device of Examples 1-10, wherein the variable optical material is disposed over a surface of the display.

EXAMPLE 13

The user-wearable device of Examples 1-12, wherein the variable optical material includes organic or inorganic compounds.

EXAMPLE 14

The user-wearable device of Examples 1-13, wherein the variable optical material comprises electroactive proteins.

EXAMPLE 15

The user-wearable device of Examples 1-14, wherein the variable optical material comprises molecules that exhibit a change is size or shape in response to the stimulus.

EXAMPLE 16

The user-wearable device of Examples 1-15, wherein the variable optical material comprises molecules that move, rotate, twist or shift in response to the stimulus.

EXAMPLE 17

The user-wearable device of Examples 1-16, wherein the variable optical material comprises molecules that move together and/or adhere together in response to the stimulus.

EXAMPLE 18

The user-wearable device of Examples 1-16, wherein the variable light optical material comprises molecules that move away from each other in response to the stimulus.

EXAMPLE 19

The user-wearable device of Examples 1-18, wherein the variable optical material comprises molecules that form nanostructures in response to the stimulus.

EXAMPLE 20

The user-wearable device of Examples 1-19, wherein the display comprises a first ocular region corresponding to a first eye of the user and a second ocular region corresponding to a second eye of the user, and wherein the processing electronics is configured to trigger the source to provide the stimulus to a portion of the display to effect a physical and/or a chemical change in the variable optical material based on the information obtained by the sensor such that at least one of intensity of ambient light, spectral content of ambient light or direction of ambient light is changed through the first ocular region as a result of stimulus from a source triggered by the processing electronics.

EXAMPLE 21

The user-wearable device of Examples 1-19, wherein the display comprises a first ocular region corresponding to a first eye of the user and a second ocular region corresponding to a second eye of the user, and wherein the processing electronics is configured to trigger the source to provide the stimulus to a portion of the display to effect a physical and/or a chemical change in the material based on the information obtained by the sensor such that at least one of intensity of ambient light, spectral content of ambient light or direction of ambient light through the first ocular region is changed differently as compared to intensity of ambient light, spectral content of ambient light or direction of ambient light through the second ocular region.

EXAMPLE 22

The user-wearable device of Examples 1-19, wherein the processing electronics is configured to trigger the source to provide the stimulus to the display to effect a physical and/or a chemical change in the material based on the information obtained by the sensor such that attenuation of intensity of ambient light transmitted through a first portion of the display is greater than attenuation of intensity of ambient light transmitted through a second portion of the display.

EXAMPLE 23

The user-wearable device of Examples 22, wherein the intensity of ambient light incident on the first portion of the display is greater than intensity of ambient light incident on the second portion of the display.

EXAMPLE 24

The user-wearable device of Examples 22 or 23, wherein the processing electronics is configured to trigger the source to provide the stimulus to the display to effect a physical and/or a chemical change in the material based on the information obtained by the sensor such that the intensity of ambient light transmitted through the second portion of the display is reduced.

EXAMPLE 25

The user-wearable device of Examples 1-19, wherein the display comprises a first ocular region corresponding to a first eye of the user and a second ocular region corresponding to a second eye of the user, and wherein the processing electronics is configured to trigger the source to provide the stimulus to the display to effect a physical and/or a chemical change in the material based on the information obtained by the sensor such that intensity of ambient light transmitted through a portion of the first ocular region is reduced.

EXAMPLE 26

The user-wearable device of Examples 1-19, wherein the processing electronics is configured to trigger the source to provide the stimulus to the display to effect a physical and/or a chemical change in the material based on the information obtained by the sensor such that the spectrum of ambient light transmitted through a first portion of the display is different than the spectrum of ambient light transmitted through a second portion of the display.

EXAMPLE 27

The user-wearable device of Examples 1-19, wherein the display comprises a first lens corresponding to a first eye of the user and a second lens corresponding to a second eye of the user, and wherein the processing electronics is configured to trigger the source to provide the stimulus to the display to effect a physical and/or a chemical change in the variable optical material associated with the first lens based on the information obtained by the sensor such that intensity of ambient light transmitted through only the first lens is reduced as a result of stimulus from a source triggered by the processing electronics.

EXAMPLE 28

The user-wearable device of Examples 1-19, wherein the display comprises a first lens corresponding to a first eye of the user and a second lens corresponding to a second eye of the user, and wherein the processing electronics is configured to trigger the source to provide the stimulus to the display to effect a physical and/or a chemical change in the variable optical material associated with the first lens based on the information obtained by the sensor such that intensity of ambient light transmitted through a portion of the first lens is reduced by an amount greater than another portion of the first lens.

EXAMPLE 29

The user-wearable device of Example 28, wherein the processing electronics is configured to trigger the source to provide the stimulus to the display to effect a physical and/or a chemical change in the variable optical material associated with the second lens based on the information obtained by the sensor such that intensity of ambient light transmitted through a portion of the second lens is reduced.

EXAMPLE 30

The user-wearable device of Examples 1-19, wherein the display comprises a first lens corresponding to a first eye of the user and a second lens corresponding to a second eye of the user, and wherein the processing electronics is configured to trigger the source to provide the stimulus to the display to effect a physical and/or a chemical change in the variable optical material associated with the first lens based on the information obtained by the sensor such that intensity of ambient light transmitted through the first lens is attenuated more than through the second lens.

EXAMPLE 31

The user-wearable device of Example 30, wherein the processing electronics is configured to trigger the source to provide the stimulus to the display to effect a physical and/or a chemical change in the variable optical material associated with the second lens based on the information obtained by the sensor such that intensity of ambient light transmitted through the second lens is reduced.

EXAMPLE 32

The user-wearable device of Examples 1-19, wherein the display comprises a first lens corresponding to a first eye of the user and a second lens corresponding to a second eye of the user, and wherein the processing electronics is configured to trigger the source to provide the stimulus to the display to effect a physical and/or a chemical change in variable optical material associated with the first or second lens based on the information obtained by the sensor such that spectrum of ambient light transmitted through the first and second lenses is different.

EXAMPLE 33

The user-wearable device of Examples 1-19, wherein the display comprises a first lens corresponding to a first eye of the user and a second lens corresponding to a second eye of the user, and wherein the processing electronics is configured to trigger the source to provide the stimulus to the display to effect a physical and/or a chemical change in the variable optical material associated with the first or second lens based on the information obtained by the sensor such that the spectrum of ambient light transmitted through a portion of the first lenses is different than another portion of the first lens.

EXAMPLE 34

The user-wearable device of Example 33, wherein the display comprises a first lens corresponding to a first eye of the user and a second lens corresponding to a second eye of the user, and wherein the processing electronics is configured to trigger the source to provide the stimulus to the display to effect a physical and/or a chemical change in the variable optical material associated with the first or second lens based on the information obtained by the sensor such that the spectrum of ambient light transmitted through a portion of the first lenses is different than another portion of the second lens.

EXAMPLE 35

The user-wearable device of Examples 1-19, wherein an object as seen by the wearer's eye through the display appears to be aligned with at least one portion of the display, and wherein the processing electronics is configured to cause the source to provide the stimulus to the at least one portion of the display for which the object appears to be aligned to effect a physical and/or a chemical change in the variable optical material such that at least one of intensity of light from said object, spectral content of said light from said object or direction of said light from said object is changed.

EXAMPLE 36

The user-wearable device of Example 35, wherein the processing electronics is configured to determine the at least one portion of the display for which the object appears to be aligned based on the movement of the user's head as tracked by said sensor.

EXAMPLE 37

The user-wearable device of any of Example 35-36, wherein the processing electronics is configured to cause the source to provide the stimulus to the at least one portion of the display to effect a physical and/or a chemical change in the variable optical material such that the intensity of ambient light reduced.

EXAMPLE 38

The user-wearable device of any of the Examples above, further comprising a head pose sensor.

EXAMPLE 39

The user-wearable device of any of the Examples above, further configured to adjust the location of the at least one portion of the display through which at least one of intensity of ambient light, spectral content of ambient light or direction of ambient light is changed based on feedback from the user.

EXAMPLE 40

The user-wearable device of any of the Examples above, further configured to adjust the size of the at least one portion of the display through which at least one of intensity of ambient light, spectral content of ambient light or direction of ambient light is changed based on feedback from the user.

EXAMPLE 41

The user-wearable device of any of the Examples above, further configured to adjust the amount by which at least one of intensity of ambient light, spectral content of ambient light or direction of ambient light is changed based on feedback from the user.

EXAMPLE 42

A method of manipulating light transmitted through a user-wearable display device comprising a display surface including a variable optical material that varies at least one of intensity of ambient light, spectral content of ambient light or direction of ambient light transmitted through the display surface in response to a stimulus, the method comprising: obtaining measurement about ambient light condition in an environment surrounding the user using a sensor; determining intensity of light incident on a first location associated with a first portion of the display surface and a second location associated with a second portion of the display surface, said first location closer to said first portion of the display surface than said second portion, said second location closer to said second portion of the display surface than said first portion; controlling a source to provide a first stimulus to the first portion of the display surface to effect a physical and/or chemical change in the material such that at least one of intensity of ambient light, spectral content of ambient light or direction of ambient light incident on the first portion is changed by a first amount; and controlling the source to provide a second stimulus to the second portion of the display surface to effect a physical and/or chemical change in the material such that at least one of intensity of ambient light, spectral content of ambient light or direction of ambient light incident on the second portion is changed by a second amount.

EXAMPLE 43

The method of Example 42, wherein the first amount is different than the second amount.

BRIEF DESCRIPTION OF THE DRAWINGS

FIG. 11 is a flowchart illustrating a method of varying transmission of light through a display lens.

FIG. 12A is a side view of a display lens including a portion with reduced ambient light transmission. FIG. 12B is a front view of the display lens illustrated in FIG. 12A as seen from a side opposite the eye side.

Like reference numbers and designations in the various drawings indicate like elements.

DETAILED DESCRIPTION

Figure 1:
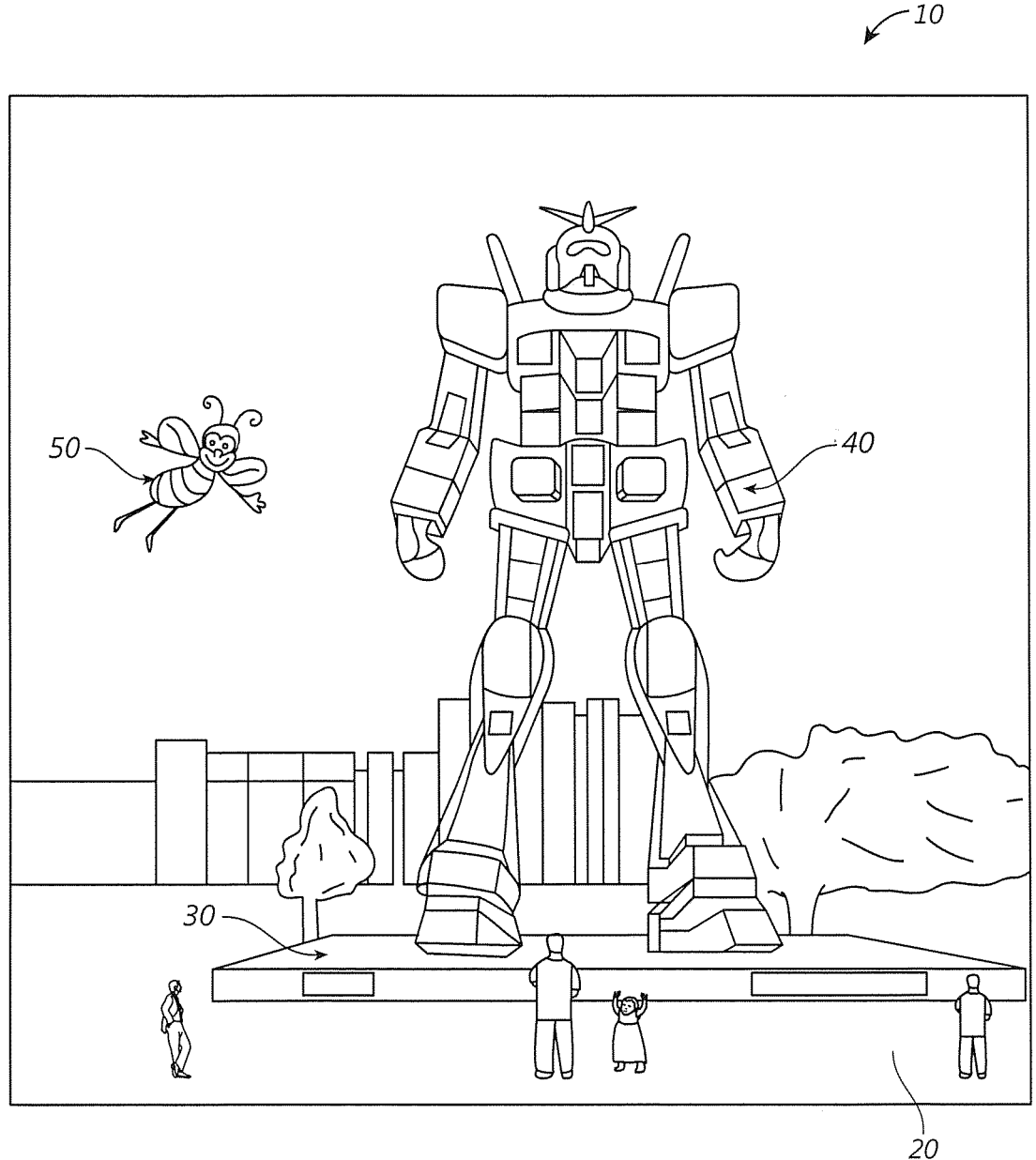
FIG. 1 illustrates a user's view of augmented reality (AR) through an AR device.

The embodiments contemplated herein include a wearable display device (e.g., an augmented reality and/or virtual reality eyewear) comprising at least one variable optical material that can vary at least one of: the intensity of ambient light transmitted through the display device, spectral content of ambient light transmitted through the display device, or the optical path of the ambient light transmitted through the display device (e.g., by diffraction or by changing the refractive index of the variable optical element) in response to an external stimulus (e.g., an optical stimulus, an electrical stimulus, a thermal stimulus, an ultrasonic/sonic stimulus, a radiation pressure, etc.). In various embodiments, the at least one variable optical material can be configured to attenuate the intensity of the ambient light in one or more wavelength ranges. In some embodiments, the at least one variable optical material can be configured to reflect, refract, scatter, diffract or absorb incoming light. The wearable display device takes advantage of the physical changes/chemical changes that are brought about in the at least one variable optical material by the external stimulus. As a result of the external stimulus, the at least one variable optical material can vary at least one of the intensity of ambient light transmitted through the display device, spectral content of ambient light transmitted through the display device, or the optical path of the ambient light transmitted through the display device depending on the intensity and/or spectral characteristics of the incoming light to improve user experience. Various studies can be performed to characterize the light altering characteristics of the variable optical material. Different studies can also be performed to characterize the type of light alteration that will result in a desired user experience for different types of ambient light sources. Feedback from the various studies can be taken into consideration to determine which regions of the display device should have altered light transmission and the amount of light alteration that would provide the desired user experience.

In some embodiments, the at least one variable optical material can be embedded in a display surface of the display device. In some other embodiments, the at least one variable optical material can be included in an accessory component that can be disposed over the display device. The at least one variable optical material can include photosensitive, electroactive and/or radiosensitive materials. In some embodiments, the at least one variable optical material can comprise organic or inorganic compounds. In some embodiments, the at least one variable optical material can comprise photosensitive materials, such as, for example, silver-based compounds (e.g., silver chloride or silver halide). In some other embodiments, the at least one variable optical material can comprise organic compounds such as oxazines and/or napthopyrans. In some embodiments, the at least one variable optical material can comprise one or more layers of molecules.

The at least one variable optical material can be activated by an optical stimulus provided from a source of illumination, for example, on the eyewear or integrated with the eyewear. The source of illumination can be monochromatic or polychromatic. In various embodiments, the source of illumination can include a LED, a scanning fiber projector, an ultraviolet source of light or a source configured to provide an electron beam. The source of illumination can be controlled by electrical or mechanical devices. For example, in some embodiments, the source of illumination can be controlled by a movable shutter or a variable filter. As another example, the source of illumination can be electrically controlled by a processor.

The processor is configured to trigger the device that provides optical, electrical, thermal and/or sonic/ultrasonic stimulus based on information obtained from one or more sensors (e.g., a light sensor, one or more cameras, eye-tracking cameras, position sensing devices, pose sensing devices, environmental sensors configured to detect temperature, global positioning system sub-assemblies, accelerometers, color sensors, etc.). For example, the processor can be configured to turn on or turn off, activate or deactivate, or otherwise control the device that provides optical, electrical, thermal and/or sonic/ultrasonic stimulus that would activate or control the at least one variable material in different portions of the display device to change at least one of: the intensity of ambient light transmitted through the display device, spectral content of ambient light transmitted through the display device, or the optical path of the ambient light transmitted through the display device based on information obtained from the one or more sensors.

In response to the stimulus, the at least one variable optical material can undergo a physical and/or a chemical change. For example, the molecules of the at least one variable optical material can undergo a change in size (e.g., shrink or enlarge) in response to the stimulus. As another example, the molecules of the at least one variable optical material can undergo a change in shape in response to the stimulus. As yet another example, density of the molecules of the at least one variable optical material can change in response to the stimulus. As a result, the stimulus may change at least one of: the intensity of ambient light transmitted through the display device, spectral content of ambient light transmitted through the display device, or the optical path of the ambient light transmitted through the display device.

In various embodiments, the molecules of the at least one variable optical material may be configured to move, shift, rotate, twist or otherwise change or respond upon providing the stimulus. The movement, shift, rotation or twisting of molecules of the at least one variable optical material may be configured to be random in some embodiments. However, in some other embodiments, the movement, shift, rotation or twisting of molecules of the at least one variable optical material may be configured to be along a specific direction. In some embodiments, the speed with which the molecules of the at least one variable optical material are moved, shifted, rotated or twisted can be varied by changing a characteristic of the stimulus provided. In various embodiments, the molecules of the at least one variable optical material can be moved closer together in response to the stimulus. In some other embodiments, the molecules of the at least one variable optical material can be moved farther apart from each other in response to the stimulus. In some embodiments, the molecules of the at least one variable optical material can be configured to form nanostructures in response to the stimulus.

The physical and/or chemical change of the molecules of the at least one variable optical material can be brought about by controlling a characteristic of the stimulus. For example, when the stimulus is optical, the physical and/or chemical change of the molecules of the at least one variable optical material can be brought about by controlling the wavelength and/or intensity of the optical stimulus. As another example, when the stimulus is electrical, the physical and/or chemical change of the molecules of the at least one variable optical material can be brought about by controlling the voltage and/or current of the electrical stimulus. In various embodiments, the physical and/or chemical change of the molecules of the at least one variable optical material can be controlled by modulating the source that provides the stimulus. In some embodiments, the physical and/or chemical change of the molecules of the at least one variable optical material can be reversible such that when the stimulus is removed, the molecules of the at least one variable optical material revert back to their original state. In such embodiments, the stimulus is constantly provided to maintain the altered state of the molecules of the at least one variable optical material. In some other embodiments the physical and/or chemical change of the molecules of the at least one variable optical material can be maintained in the absence of the stimulus until deactivation energy is provided to revert the molecules of the at least one variable optical material to their original state. In such embodiments, the stimulus can be provided for a short duration of time to initiate the alteration of the molecules of the at least one variable optical material.

Various embodiments of the wearable display device are configured to map objects in the real world surrounding the user, including objects that are visible to the user through the display device, using a variety of sensor assemblies and/or imaging apparatus. In various embodiments, the information obtained from the variety of sensor assemblies and/or imaging apparatus can be used to create a database including, for example, the position of various objects in the real world with respect to the display device and/or the user's head/eyes and potentially other characteristics of the objects such as their size, shape, and/or how bright the objects appear. The database can be updated and/or provide updated information in real time or in near real time as the objects in the surrounding real world appear to move with respect to the display device and/or the user's head/eyes as the user moves his/her head and/or body. The database can be updated and/or provide updated information in real time or in near real time regarding position of new objects from the surrounding real world that come into the user's field of view as the user moves his/her head. The display device can be configured and/or used to locate and identify different ambient light sources in the real world visible to the user through the display device. The different ambient light sources may appear to be aligned with different portions of the viewable surface of the display device. These objects may produce glare. Accordingly, the display device can be configured to change, alter, adjust or manipulate at least one of: the intensity of ambient light, the optical path of the ambient light, or the spectral content of ambient light transmitted through different portions of the viewable surface of the display device with which the different ambient light sources appear to be aligned in order to reduce glare.

Various embodiments of the wearable display device are configured to attenuate incoming ambient light incident on various portions of the display surface. Accordingly, the amount of variation of at least one of: the intensity of ambient light transmitted through the display device, spectral content of ambient light transmitted through the display device, or the optical path of the ambient light transmitted through the display device can vary across the surface of the display device and need not be uniform. This can be advantageous in maintaining user experience when one portion of the display surface introduces more glare than another portion. For example, when a user is viewing a scene with the sun or a bright light in the background, then incoming light transmitted through a portion of the display device that is aligned with the sun or bright light can be attenuated by a larger amount than intensity of incoming light transmitted through other portions of the display device. Additionally, when a user is viewing the display device near a window or using a desk light, then incoming light transmitted through a portion of the display device near the window or the desk light can be attenuated by a larger amount than intensity of incoming light transmitted through a portion of the display device farther from the window or the desk light, since the portion of the display device near the window or the desk light may have more glare.

Reference will now be made to the figures, in which like reference numerals refer to like parts throughout. It will be appreciated that embodiments disclosed herein include optical systems, including display systems, generally. In some embodiments, the display systems are wearable, which may advantageously provide a more immersive VR or AR experience. For example, displays containing one or more waveguides (e.g., a stack of waveguides) may be configured to be worn positioned in front of the eyes of a user, or viewer. In some embodiments, two stacks of waveguides, one for each eye of a viewer, may be utilized to provide different images to each eye.

Example Display Systems

Figure 2A:
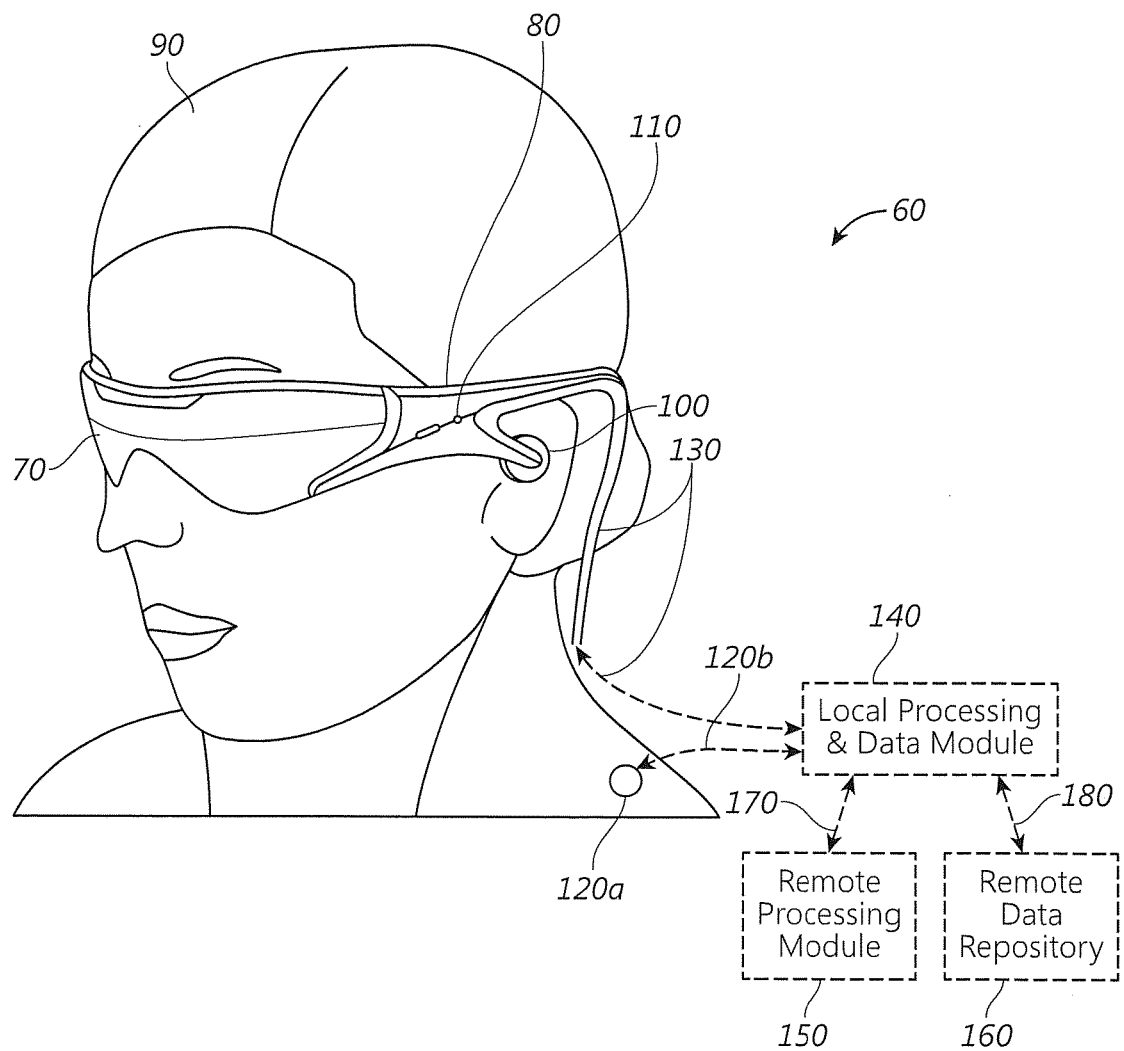
FIGS. 2A and 2B illustrate embodiments of a wearable display system.

FIG. 2A illustrates an example of wearable display system 60. The display system 60 includes a display 70, and various mechanical and electronic modules and systems to support the functioning of that display 70. The display 70 may be coupled to a frame 80, which is wearable by a display system user or viewer 90 and which is configured to position the display 70 in front of the eyes of the user 90. The display 70 may be considered eyewear in some embodiments. In some embodiments, a speaker 100 is coupled to the frame 80 and configured to be positioned adjacent the ear canal of the user 90 (in some embodiments, another speaker, not shown, is positioned adjacent the other ear canal of the user to provide stereo/shapeable sound control). In some embodiments, the display system may also include one or more microphones 110 or other devices to detect sound. In some embodiments, the microphone is configured to allow the user to provide inputs or commands to the system 60 (e.g., the selection of voice menu commands, natural language questions, etc.), and/or may allow audio communication with other persons (e.g., with other users of similar display systems. The microphone may further be configured as a peripheral sensor to collect audio data (e.g., sounds from the user and/or environment). In some embodiments, the display system may also include a peripheral sensor 120*a*, which may be separate from the frame 80 and attached to the body of the user 90 (e.g., on the head, torso, an extremity, etc. of the user 90). The peripheral sensor 120*a* may be configured to acquire data characterizing the physiological state of the user 90 in some embodiments. For example, the sensor 120*a* may be an electrode.

With continued reference to FIG. 2A, the display 70 is operatively coupled by communications link 130, such as by a wired lead or wireless connectivity, to a local data processing module 140 which may be mounted in a variety of configurations, such as fixedly attached to the frame 80, fixedly attached to a helmet or hat worn by the user, embedded in headphones, or otherwise removably attached to the user 90 (e.g., in a backpack-style configuration, in a belt-coupling style configuration). Similarly, the sensor 120*a* may be operatively coupled by communications link 120*b*, e.g., a wired lead or wireless connectivity, to the local processor and data module 140. The local processing and data module 140 may comprise a hardware processor, as well as digital memory, such as non-volatile memory (e.g., flash memory or hard disk drives), both of which may be utilized to assist in the processing, caching, and storage of data. The data include data a) captured from sensors (which may be, e.g., operatively coupled to the frame 80 or otherwise attached to the user 90), such as image capture devices (such as cameras), microphones, inertial measurement units, accelerometers, compasses, GPS units, radio devices, gyros, and/or other sensors disclosed herein; and/or b) acquired and/or processed using remote processing module 150 and/or remote data repository 160 (including data relating to virtual content), possibly for passage to the display 70 after such processing or retrieval. The local processing and data module 140 may be operatively coupled by communication links 170, 180, such as via a wired or wireless communication links, to the remote processing module 150 and remote data repository 160 such that these remote modules 150, 160 are operatively coupled to each other and available as resources to the local processing and data module 140. In some embodiments, the local processing and data module 140 may include one or more of the image capture devices, microphones, inertial measurement units, accelerometers, compasses, GPS units, radio devices, and/or gyros. In some other embodiments, one or more of these sensors may be attached to the frame 80, or may be standalone structures that communicate with the local processing and data module 140 by wired or wireless communication pathways.

With continued reference to FIG. 2A, in some embodiments, the remote processing module 150 may comprise one or more processors configured to analyze and process data and/or image information. In some embodiments, the remote data repository 160 may comprise a digital data storage facility, which may be available through the internet or other networking configuration in a "cloud" resource configuration. In some embodiments, the remote data repository 160 may include one or more remote servers, which provide information, e.g., information for generating augmented reality content, to the local processing and data module 140 and/or the remote processing module 150. In some embodiments, all data is stored and all computations are performed in the local processing and data module, allowing fully autonomous use from a remote module.

Various embodiments of the display system 60 can include one or more components (e.g., cameras, light sensors, color sensors, temperature sensors, motion detectors, accelerometers, gyroscopes, global positioning sub-systems, etc.) that are configured to sense the environment surrounding the user 90. The one or more components included in the display system 60 can also be configured to monitor the position of the head and/or track eye movements of the user 90. For example, the one or more components included in the display system 60 can be configured to determine constriction of the pupil in response to bright light, enlargement of the pupil in response to low light, blink response, etc. As another example, the one or more components included in the display system 60 can be configured to monitor and/or track movement of the user's head. In some embodiments, the one or more components included in the display system 60 can be configured to monitor and/or track position of real world objects (e.g., trees, sun, ambient light sources, etc.) with respect to the user's eyes as the user's head moves.

Figure 2B:
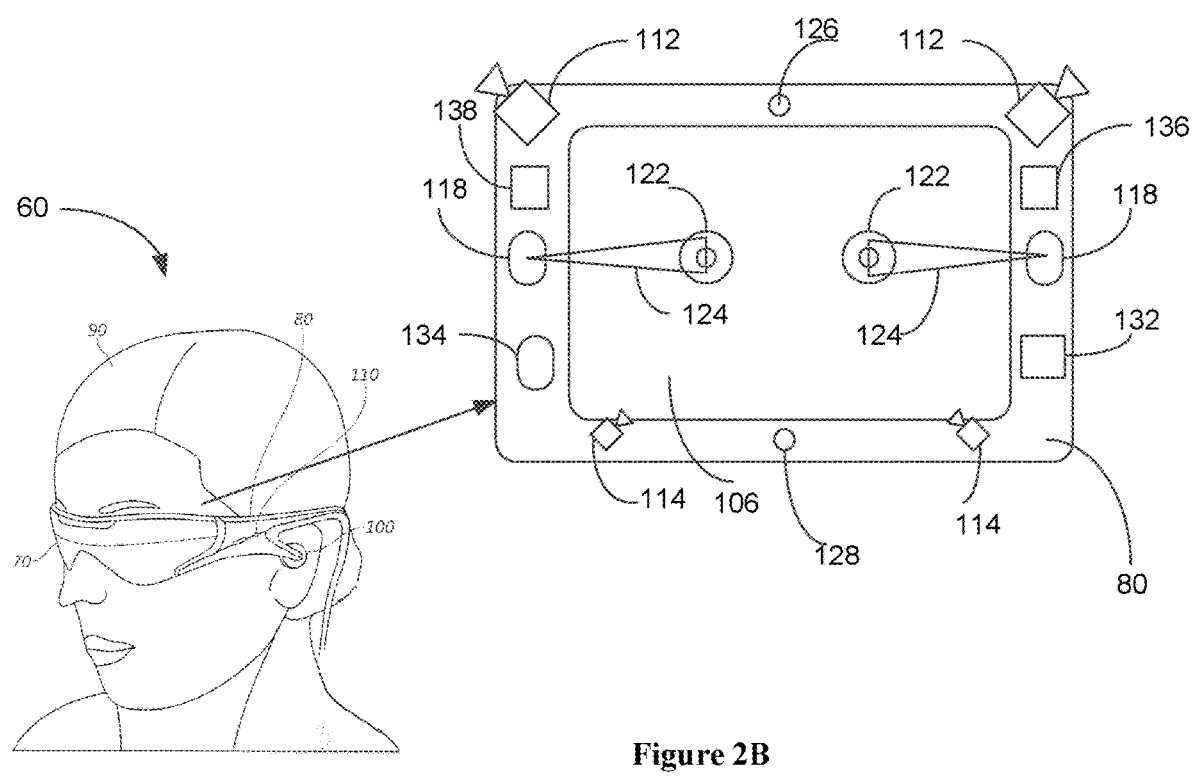

FIG. 2B illustrates some of the components included in an embodiment of the display system 60. Other embodiments may have additional or fewer components depending on the application for which the system is used. Nevertheless, FIG. 2B provides a basic idea of some of the various components that can be included in the display system 60 that are configured to sense the environment. In the embodiment illustrated in FIG. 2B, the display device 70 comprises a display lens 106 that may be mounted to a user's head or eyes by the frame 80. The display lens 106 may be configured to propagate projected light 124 from one or more light projection systems 118 into the eyes 122. The display lens 106 can also be configured to allow for transmission of at least some light from the local environment surrounding the user 90. In various embodiments of the display system 60 configured as an augmented reality device, the projected light 124 can include virtual content that may be superimposed on the real world content viewed by the user's eyes 122.

The display system can include one or more outward facing cameras 112 that are configured to image the environment around the user 90. In some embodiments, the cameras 112 can comprise wide-field-of-view machine vision cameras. In some embodiments, the cameras 112 can be dual capture visible light/non-visible (e.g., infrared) light cameras. The cameras 112 can be integrated with the frame 80 as depicted in FIG. 2B. However, in some embodiments, the cameras 112 can be positioned elsewhere. For example, the cameras 112 can be configured to be attached to the head, arms, neck or some other parts of the body of the user 90. In various embodiments, the cameras 112 need not be attached to the user 90 but instead, can be positioned beside the user.

With continued reference to FIG. 2B, the display system 60 can include one or more inward facing cameras 114 that can be configured to monitor the user's eyes 122. In various embodiments, the inward facing cameras 114 can be paired with infrared light sources (such as light emitting diodes "LED"s), which are configured to track the eyes 122 of the user 90. The system 60 can further comprise one or more light sensors 128 that are configured to sense ambient light. For example, the one or more light sensors 128 can be configured to sense at least one of intensity, wavelength or color temperature or range of the ambient light. In various embodiments, the light sensor 128 can comprise silicon photodetectors, phototransistors, photodiodes, LCD sensors, sensors that use resistance properties to detect changes in the intensity/spectral characteristic of light, infrared (IR) light sensors, etc. The system 60 can further comprise a sensor assembly 126, which may comprise one or more X, Y, and Z axis accelerometers as well as a magnetic compass and one or more X, Y, and Z axis gyros, preferably providing data at a relatively high frequency, such as 200 Hz. In some embodiments, the sensor assembly 126 can comprise a global positioning satellite (GPS) subsystem to provide information about the user's environment.

The local processing and data module 140 and/or the remote processing module 150 may comprise a processor such as an ASIC (application specific integrated circuit), FPGA (field programmable gate array), and/or ARM processor (advanced reduced-instruction-set machine), which may be configured to calculate real or near-real time user head pose from the information obtained by the inward facing cameras 114, the outward facing cameras 112, light sensor 128, and/or the sensor assembly 126. The processor can be configured to provide information about the user's environment from the information obtained by the inward facing cameras 114, the outward facing cameras 112, the light sensor 128 and/or the sensor assembly 126. In various embodiments, using the information obtained from the outward facing cameras 112, the light sensor 128 and/or the sensor assembly 126, the display system 60 can be configured to determine the ambient light conditions. For example, the information obtained from the outward facing cameras 112, the light sensor 128 and/or the sensor assembly 126 can be processed using one or more electronic processors of the local processing and data module 140 and/or the remote processing module 150 to determine whether the ambient light is diffused. If the ambient light is not diffused, then the system 60 can use the information obtained from the outward facing cameras 112, the light sensor 128 and/or the sensor assembly 126 to determine the direction from which ambient light is incident on the display 70. The system 60 can be configured to determine the type of illuminant that provides the ambient light. For example, the system 60 can be configured to determine whether the illuminant is sunlight or light from an artificial light source. As another example, the system 60 can be configured to determine the spectral composition and/or the intensity of ambient light from the information obtained from the outward facing cameras 112, the light sensor 128 and/or the sensor assembly 126.

As discussed above, the inward facing cameras 114 may be utilized to track the eyes. Accordingly, the information provided by the inward facing cameras 114 can be used to determine the object at which or the direction along which the user is looking, as well as the depth at which the user's eyes are focusing. The information provided by the inward facing cameras 114 can also be used to determine the ambient light condition. For example, the information obtained by the light sensor 128, the sensor assembly 126, the outward facing cameras 112 and possibly one or more head pose sensors can be combined with the information provided by the inward facing cameras 114 regarding the size of the pupil of the user's eyes 122 to determine the pose of the user's head (and/or eyes) and locate and identify different ambient light sources in the real world visible to the user through the display device. The system 60 can be configured to determine the direction along which ambient light is incident, the intensity of ambient light and/or the spectral characteristics of the ambient light that is incident on the display 70. The information obtained by the light sensor 128, the sensor assembly 126, the outward facing cameras 112, and possibly one or more head pose sensors, regarding the location of object as well as possibly the pose of the user's head can be combined with the information provided by the inward facing cameras 114 regarding the size of the pupil of the user's eyes 122 and possibly the direction that the user's eyes are pointing, to identify portions of the display 70 that coincide, are aligned with and/or overlap with the ambient light sources in the view of the real world visible to the user. The information from the light sensor 128, the sensor assembly 126, the outward facing cameras 112 and/or inward facing cameras 114 may be utilized in conjunction with data possibly from an associated cloud computing resource, to map the local world and object, features or characteristics thereof and the position of the objects and features of the local world with respect to the eyes of the user.

In various embodiments as discussed below, the display lens 106 can include a variable optical component having at least one material that can be configured to vary at least one of: the intensity of ambient light transmitted through at least a portion of the display lens 106, spectral content of ambient light transmitted through at least a portion of the display lens 106, or the optical path of the ambient light transmitted through at least a portion of the display lens 106 in response to a stimulus provided by one or more components of the display system 60 to improve user experience. For example, if the display system 60 determines based on the information obtained from the light sensor 128, the sensor assembly 126, the outward facing cameras 112 and/or inward facing cameras 114 that the ambient light conditions on a portion of the display lens 106 are bright or that a bright object is in the field of view of the user and is aligned with a portion of the display, then the display system 60 can be configured to provide a stimulus (e.g., thermal, sonic/ultrasonic, optical or electrical stimulus) that can change at least one of: the intensity of ambient light transmitted through that portion of the display lens 106, spectral content of ambient light transmitted through that portion of the display lens 106, or the optical path of the ambient light transmitted through that portion of the display lens 106 to reduce intensity of ambient light transmitted through that portion of the display lens 106 and/or from the bright object and improve visual experience.

Accordingly, various embodiments of the display system 60 can comprise a light emitting module 134 that is configured to emit ultraviolet, infrared and/or visible light to provide an optical stimulus to at least a portion of the display lens 106; an electrical system 132 that can provide an electrical stimulus to at least a portion of the display lens 106; a thermal source 136 that can provide a thermal stimulus to at least a portion of the display lens 106; and/or a sonic/ultrasonic transducer 138 to provide sonic and/or ultrasonic stimulus to at least a portion of the display lens 106. The optical stimulus provided by the light emitting module 134 can include a directed narrow beam of invisible and/or visible light that is incident on the portion of the display lens 106 that is configured to have reduced light transmission. In various embodiments, the display lens 106 can include an arrangement of electrodes (e.g., an electrode array, a two-dimensional grid of electrodes) that are electrically connected to the electrical system 132. The electrical system 132 can provide an electrical signal (e.g., a voltage signal or a current signal) to the electrodes in a portion of the display lens 106 that is configured to change the intensity of ambient light, change the spectral content of ambient light and/or change the direction of ambient light incident on the display lens 106. The light emitting module 134, the thermal source 136, the sonic/ultrasonic transducer 138, and/or the electrical system 132 can be integrated with the frame 80 as shown in FIG. 2B. Alternatively, in some embodiments one or all the light emitting module 134 the thermal source 136, the sonic/ultrasonic transducer 138 and the electrical system 132 can be positioned remotely from the display 70.

Figure 3:
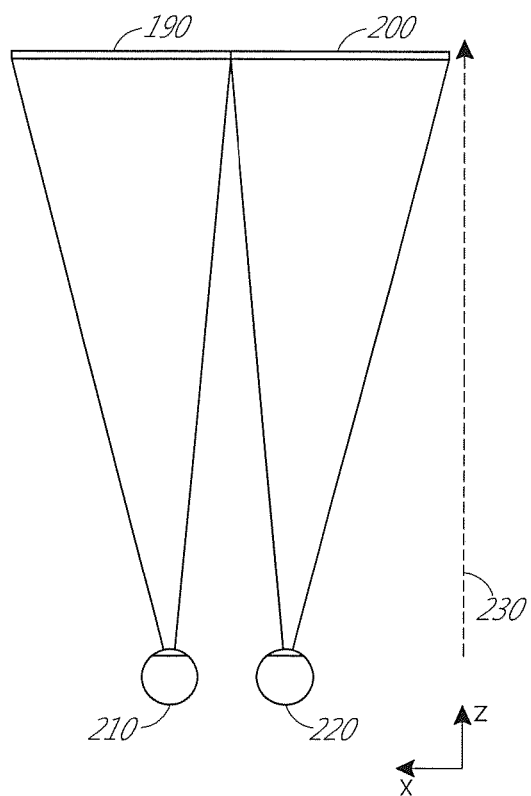
FIG. 3 illustrates a conventional display system for simulating three-dimensional imagery for a user.

The perception of an image as being "three-dimensional" or "3-D" may be achieved by providing slightly different presentations of the image to each eye of the viewer. FIG. 3 illustrates a conventional display system for simulating three-dimensional imagery for a user. Two distinct images 190, 200—one for each eye 210, 220—are outputted to the user. The images 190, 200 are spaced from the eyes 210, 220 by a distance 230 along an optical or z-axis that is parallel to the line of sight of the viewer. The images 190, 200 are flat and the eyes 210, 220 may focus on the images by assuming a single accommodated state. Such 3-D display systems rely on the human visual system to combine the images 190, 200 to provide a perception of depth and/or scale for the combined image.

It will be appreciated, however, that the human visual system is more complicated and providing a realistic perception of depth is more challenging. For example, many viewers of conventional "3-D" display systems find such systems to be uncomfortable or may not perceive a sense of depth at all. Without being limited by theory, it is believed that viewers of an object may perceive the object as being "three-dimensional" due to a combination of vergence and accommodation. Vergence movements (i.e., rotation of the eyes so that the pupils move toward or away from each other to converge the lines of sight of the eyes to fixate upon an object) of the two eyes relative to each other are closely associated with focusing (or "accommodation") of the lenses and pupils of the eyes. Under normal conditions, changing the focus of the lenses of the eyes, or accommodating the eyes, to change focus from one object to another object at a different distance will automatically cause a matching change in vergence to the same distance, under a relationship known as the "accommodation-vergence reflex," as well as pupil dilation or constriction. Likewise, a change in vergence will trigger a matching change in accommodation of lens shape and pupil size, under normal conditions. As noted herein, many stereoscopic or "3-D" display systems display a scene using slightly different presentations (and, so, slightly different images) to each eye such that a three-dimensional perspective is perceived by the human visual system. Such systems are uncomfortable for many viewers, however, since they, among other things, simply provide a different presentation of a scene, but with the eyes viewing all the image information at a single accommodated state, and work against the "accommodation-vergence reflex." Display systems that provide a better match between accommodation and vergence may form more realistic and comfortable simulations of three-dimensional imagery contributing to increased duration of wear and in turn compliance to diagnostic and therapy protocols.

Figure 4:
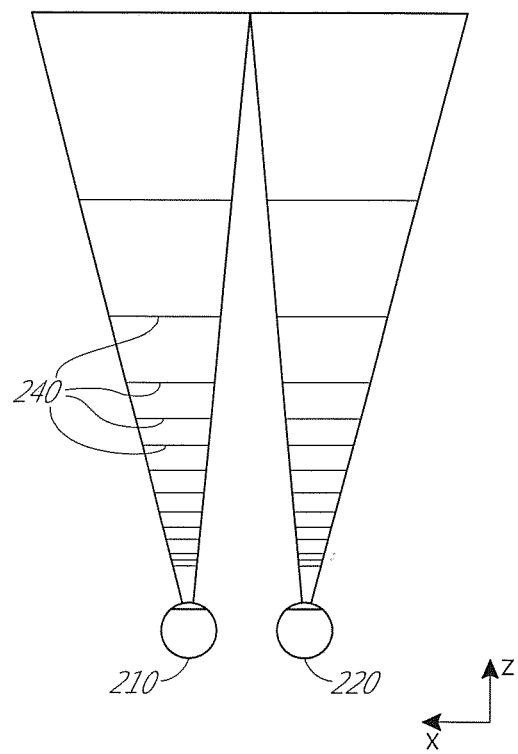
FIG. 4 illustrates aspects of an approach for simulating three-dimensional imagery using multiple depth planes.

FIG. 4 illustrates aspects of an approach for simulating three-dimensional imagery using multiple depth planes. With reference to FIG. 4, objects at various distances from eyes 210, 220 on the z-axis are accommodated by the eyes 210, 220 so that those objects are in focus. The eyes 210, 220 assume particular accommodated states to bring into focus objects at different distances along the z-axis. Consequently, a particular accommodated state may be said to be associated with a particular one of depth planes 240, with has an associated focal distance, such that objects or parts of objects in a particular depth plane are in focus when the eye is in the accommodated state for that depth plane. In some embodiments, three-dimensional imagery may be simulated by providing different presentations of an image for each of the eyes 210, 220, and also by providing different presentations of the image corresponding to each of the depth planes. While shown as being separate for clarity of illustration, it will be appreciated that the fields of view of the eyes 210, 220 may overlap, for example, as distance along the z-axis increases. In addition, while shown as flat for ease of illustration, it will be appreciated that the contours of a depth plane may be curved in physical space, such that all features in a depth plane are in focus with the eye in a particular accommodated state.

Figure 5A:
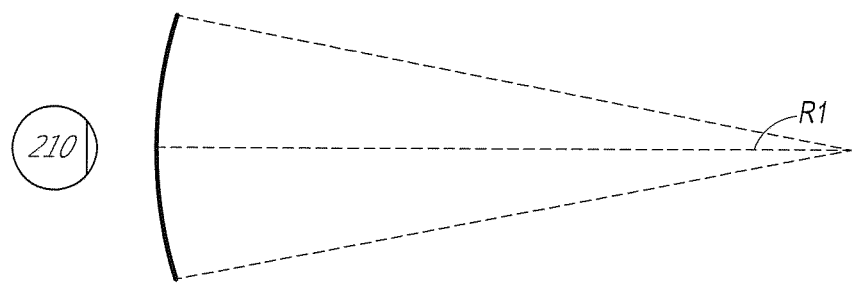
FIGS. 5A-5C illustrate relationships between radius of curvature and focal radius.
Figure 5B:
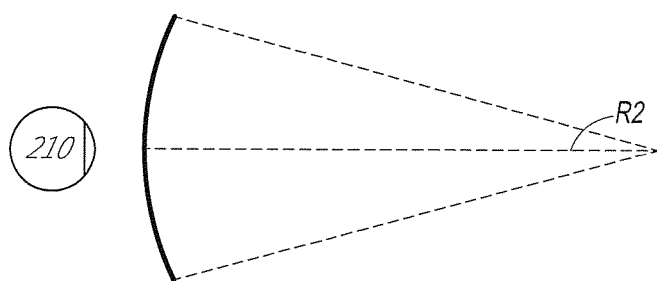
Figure 5C:
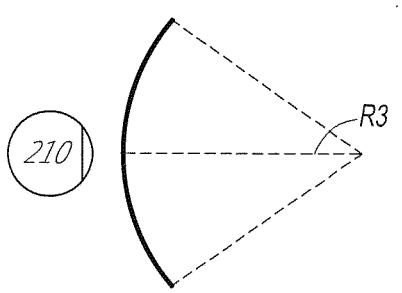

The distance between an object and the eye 210 or 220 may also change the amount of divergence of light from that object, as viewed by that eye. FIGS. 5A-5C illustrate relationships between distance and the divergence of light rays. The distance between the object and the eye 210 is represented by, in order of decreasing distance, R1, R2, and R3. As shown in FIGS. 5A-5C, the light rays become more divergent as distance to the object decreases. As distance increases, the light rays become more collimated. Stated another way, it may be said that the light field produced by a point (the object or a part of the object) has a spherical wavefront curvature, which is a function of how far away the point is from the eye of the user. The curvature increases with decreasing distance between the object and the eye 210. Consequently, at different depth planes, the degree of divergence of light rays is also different, with the degree of divergence increasing with decreasing distance between depth planes and the viewer's eye 210. While only a single eye 210 is illustrated for clarity of illustration in FIGS. 5A-5C and other figures herein, it will be appreciated that the discussions regarding eye 210 may be applied to both eyes 210 and 220 of a viewer.

Without being limited by theory, it is believed that the human eye typically can interpret a finite number of depth planes to provide depth perception. Consequently, a highly believable simulation of perceived depth may be achieved by providing, to the eye, different presentations of an image corresponding to each of these limited number of depth planes. The different presentations may be separately focused by the viewer's eyes, thereby helping to provide the user with depth cues based on the accommodation of the eye required to bring into focus different image features for the scene located on different depth plane and/or based on observing different image features on different depth planes being out of focus.

Figure 6:
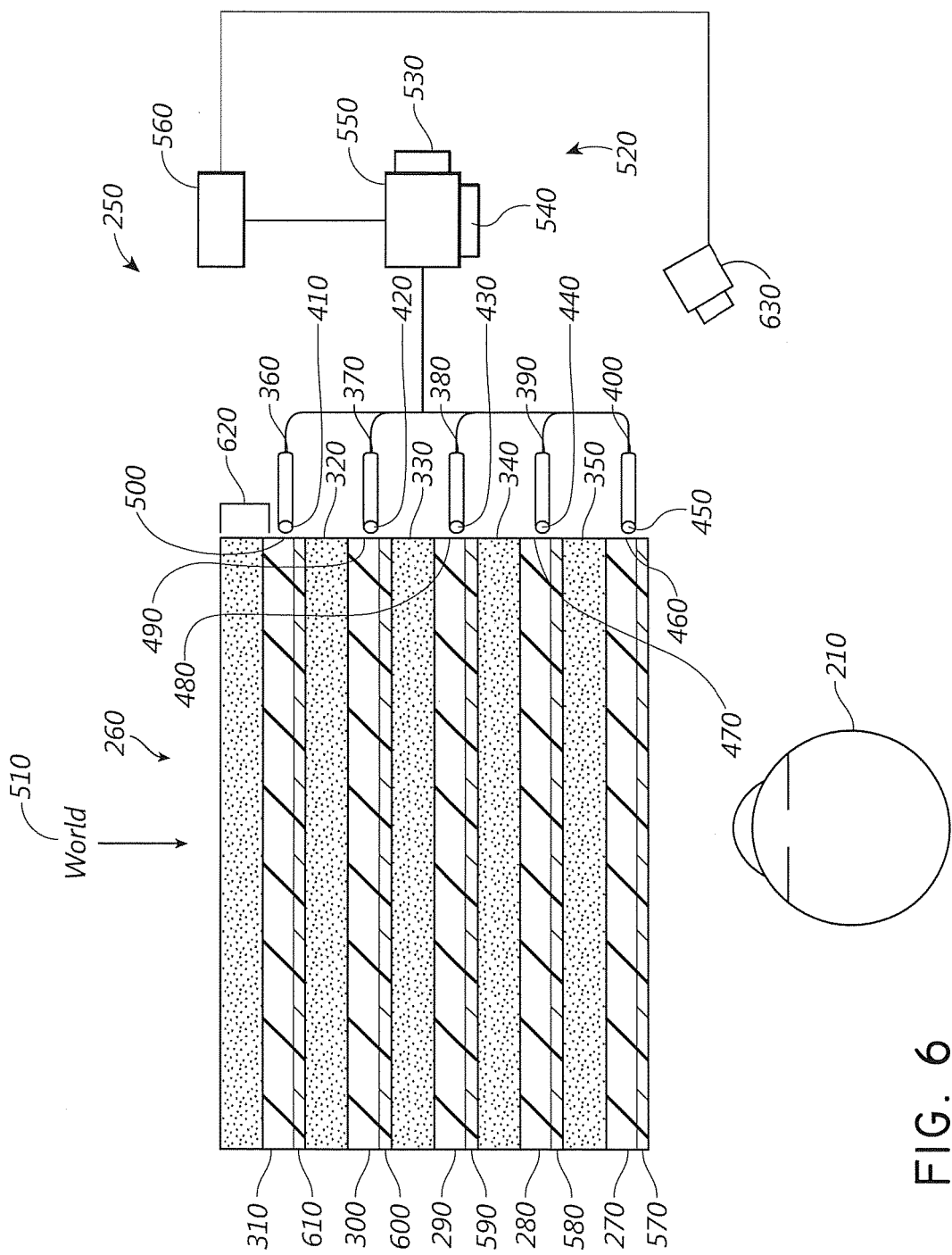
FIG. 6 illustrates an example of a waveguide stack for outputting image information to a user.

FIG. 6 illustrates an example of a waveguide stack for outputting image information to a user. A display system 250 includes a stack of waveguides, or stacked waveguide assembly, 260 that may be utilized to provide three-dimensional perception to the eye/brain using a plurality of waveguides 270, 280, 290, 300, 310. In some embodiments, the display system 250 is the system 60 of FIG. 2A and/or FIG. 2B, with FIG. 6 schematically showing some parts of that system 60 in greater detail. For example, the waveguide assembly 260 may be part of the display 70 of FIG. 2A. As another example, the waveguide assembly 260 may be part of the display lens 106 of FIG. 2B. It will be appreciated that the display system 250 may be considered a light field display in some embodiments.

With continued reference to FIG. 6, the waveguide assembly 260 may also include a plurality of features 320, 330, 340, 350 between the waveguides. In some embodiments, the features 320, 330, 340, 350 may be one or more lenses. The waveguides 270, 280, 290, 300, 310 and/or the plurality of lenses 320, 330, 340, 350 may be configured to send image information to the eye with various levels of wavefront curvature or light ray divergence. Each waveguide level may be associated with a particular depth plane and may be configured to output image information corresponding to that depth plane. Image injection devices 360, 370, 380, 390, 400 may function as a source of light for the waveguides and may be utilized to inject image information into the waveguides 270, 280, 290, 300, 310, each of which may be configured, as described herein, to distribute incoming light across each respective waveguide, for output toward the eye 210. Light exits an output surface 410, 420, 430, 440, 450 of the image injection devices 360, 370, 380, 390, 400 and is injected into a corresponding input surface 460, 470, 480, 490, 500 of the waveguides 270, 280, 290, 300, 310. In some embodiments, the each of the input surfaces 460, 470, 480, 490, 500 may be an edge of a corresponding waveguide, or may be part of a major surface of the corresponding waveguide (that is, one of the waveguide surfaces directly facing the world 510 or the viewer's eye 210). In some embodiments, a single beam of light (e.g. a collimated beam) may be injected into each waveguide to output an entire field of cloned collimated beams that are directed toward the eye 210 at particular angles (and amounts of divergence) corresponding to the depth plane associated with a particular waveguide. In some embodiments, a single one of the image injection devices 360, 370, 380, 390, 400 may be associated with and inject light into a plurality (e.g., three) of the waveguides 270, 280, 290, 300, 310.

In some embodiments, the image injection devices 360, 370, 380, 390, 400 are discrete displays that each produce image information for injection into a corresponding waveguide 270, 280, 290, 300, 310, respectively. In some other embodiments, the image injection devices 360, 370, 380, 390, 400 are the output ends of a single multiplexed display which may, e.g., pipe image information via one or more optical conduits (such as fiber optic cables) to each of the image injection devices 360, 370, 380, 390, 400. It will be appreciated that the image information provided by the image injection devices 360, 370, 380, 390, 400 may include light of different wavelengths, or colors (e.g., different component colors, as discussed herein). In some embodiments, the image injection devices 360, 370, 380, 390, 400 can be a part of the light projection systems 118 of FIG. 2B.

In some embodiments, the light injected into the waveguides 270, 280, 290, 300, 310 is provided by a light projector system 520, which comprises a light module 530, which may include a light emitter, such as a light emitting diode (LED). The light from the light module 530 may be directed to and modified by a light modulator 540, e.g., a spatial light modulator, via a beam splitter 550. The light modulator 540 may be configured to change the perceived intensity of the light injected into the waveguides 270, 280, 290, 300, 310. Examples of spatial light modulators include liquid crystal displays (LCD) including a liquid crystal on silicon (LCOS) displays. In some embodiments, the light projector system 520 can be a part of the light projection systems 118 of FIG. 2B.

In some embodiments, the display system 250 may be a scanning fiber display comprising one or more scanning fibers configured to project light in various patterns (e.g., raster scan, spiral scan, Lissajous patterns, etc.) into one or more waveguides 270, 280, 290, 300, 310 and ultimately to the eye 210 of the viewer. In some embodiments, the illustrated image injection devices 360, 370, 380, 390, 400 may schematically represent a single scanning fiber or a bundle of scanning fibers configured to inject light into one or a plurality of the waveguides 270, 280, 290, 300, 310. In some other embodiments, the illustrated image injection devices 360, 370, 380, 390, 400 may schematically represent a plurality of scanning fibers or a plurality of bundles of scanning fibers, each of which are configured to inject light into an associated one of the waveguides 270, 280, 290, 300, 310. It will be appreciated that one or more optical fibers may be configured to transmit light from the light module 530 to the one or more waveguides 270, 280, 290, 300, 310. It will be appreciated that one or more intervening optical structures may be provided between the scanning fiber, or fibers, and the one or more waveguides 270, 280, 290, 300, 310 to, e.g., redirect light exiting the scanning fiber into the one or more waveguides 270, 280, 290, 300, 310.

A controller 560 controls the operation of one or more of the stacked waveguide assembly 260, including operation of the image injection devices 360, 370, 380, 390, 400, the light source 530, and the light modulator 540. In some embodiments, the controller 560 is part of the local data processing module 140. The controller 560 includes programming (e.g., instructions in a non-transitory medium) that regulates the timing and provision of image information to the waveguides 270, 280, 290, 300, 310 according to, e.g., any of the various schemes disclosed herein. In some embodiments, the controller may be a single integral device, or a distributed system connected by wired or wireless communication channels. The controller 560 may be part of the processing modules 140 or 150 (FIG. 2A) in some embodiments.

With continued reference to FIG. 6, the waveguides 270, 280, 290, 300, 310 may be configured to propagate light within each respective waveguide by total internal reflection (TIR). The waveguides 270, 280, 290, 300, 310 may each be planar or have another shape (e.g., curved), with major top and bottom surfaces and edges extending between those major top and bottom surfaces. In the illustrated configuration, the waveguides 270, 280, 290, 300, 310 may each include out-coupling optical elements 570, 580, 590, 600, 610 that are configured to extract light out of a waveguide by redirecting the light, propagating within each respective waveguide, out of the waveguide to output image information to the eye 210. Extracted light may also be referred to as out-coupled light and the out-coupling optical elements light may also be referred to light extracting optical elements. An extracted beam of light may be outputted by the waveguide at locations at which the light propagating in the waveguide strikes a light extracting optical element. The out-coupling optical elements 570, 580, 590, 600, 610 may, for example, be gratings, including diffractive optical features, as discussed further herein. While illustrated disposed at the bottom major surfaces of the waveguides 270, 280, 290, 300, 310, for ease of description and drawing clarity, in some embodiments, the out-coupling optical elements 570, 580, 590, 600, 610 may be disposed at the top and/or bottom major surfaces, and/or may be disposed directly in the volume of the waveguides 270, 280, 290, 300, 310, as discussed further herein. In some embodiments, the out-coupling optical elements 570, 580, 590, 600, 610 may be formed in a layer of material that is attached to a transparent substrate to form the waveguides 270, 280, 290, 300, 310. In some other embodiments, the waveguides 270, 280, 290, 300, 310 may be a monolithic piece of material and the out-coupling optical elements 570, 580, 590, 600, 610 may be formed on a surface and/or in the interior of that piece of material.

With continued reference to FIG. 6, as discussed herein, each waveguide 270, 280, 290, 300, 310 is configured to output light to form an image corresponding to a particular depth plane. For example, the waveguide 270 nearest the eye may be configured to deliver collimated light (which was injected into such waveguide 270), to the eye 210. The collimated light may be representative of the optical infinity focal plane. The next waveguide up 280 may be configured to send out collimated light which passes through the first lens 350 (e.g., a negative lens) before it can reach the eye 210; such first lens 350 may be configured to create a slight convex wavefront curvature so that the eye/brain interprets light coming from that next waveguide up 280 as coming from a first focal plane closer inward toward the eye 210 from optical infinity. Similarly, the third up waveguide 290 passes its output light through both the first 350 and second 340 lenses before reaching the eye 210; the combined optical power of the first 350 and second 340 lenses may be configured to create another incremental amount of wavefront curvature so that the eye/brain interprets light coming from the third waveguide 290 as coming from a second focal plane that is even closer inward toward the person from optical infinity than was light from the next waveguide up 280.

The other waveguide layers 300, 310 and lenses 330, 320 are similarly configured, with the highest waveguide 310 in the stack sending its output through all of the lenses between it and the eye for an aggregate focal power representative of the closest focal plane to the person. To compensate for the stack of lenses 320, 330, 340, 350 when viewing/interpreting light coming from the world 510 on the other side of the stacked waveguide assembly 260, a compensating lens layer 620 may be disposed at the top of the stack to compensate for the aggregate power of the lens stack 320, 330, 340, 350 below. Such a configuration provides as many perceived focal planes as there are available waveguide/lens pairings. Both the out-coupling optical elements of the waveguides and the focusing aspects of the lenses may be static (i.e., not dynamic or electro-active). In some alternative embodiments, either or both may be dynamic using electro-active features.

In some embodiments, two or more of the waveguides 270, 280, 290, 300, 310 may have the same associated depth plane. For example, multiple waveguides 270, 280, 290, 300, 310 may be configured to output images set to the same depth plane, or multiple subsets of the waveguides 270, 280, 290, 300, 310 may be configured to output images set to the same plurality of depth planes, with one set for each depth plane. This can provide advantages for forming a tiled image to provide an expanded field of view at those depth planes.

With continued reference to FIG. 6, the out-coupling optical elements 570, 580, 590, 600, 610 may be configured to both redirect light out of their respective waveguides and to output this light with the appropriate amount of divergence or collimation for a particular depth plane associated with the waveguide. As a result, waveguides having different associated depth planes may have different configurations of out-coupling optical elements 570, 580, 590, 600, 610, which output light with a different amount of divergence depending on the associated depth plane. In some embodiments, the light extracting optical elements 570, 580, 590, 600, 610 may be volumetric or surface features, which may be configured to output light at specific angles. For example, the light extracting optical elements 570, 580, 590, 600, 610 may be volume holograms, surface holograms, and/or diffraction gratings. In some embodiments, the features 320, 330, 340, 350 may not be lenses; rather, they may simply be spacers (e.g., cladding layers and/or structures for forming air gaps).

In some embodiments, the out-coupling optical elements 570, 580, 590, 600, 610 are diffractive features that form a diffraction pattern, or "diffractive optical element" (also referred to herein as a "DOE"). Preferably, the DOE's have a sufficiently low diffraction efficiency so that only a portion of the light of the beam is deflected away toward the eye 210 with each intersection of the DOE, while the rest continues to move through a waveguide via TIR. The light carrying the image information is thus divided into a number of related exit beams that exit the waveguide at a multiplicity of locations and the result is a fairly uniform pattern of exit emission toward the eye 210 for this particular collimated beam bouncing around within a waveguide.

In some embodiments, one or more DOEs may be switchable between "on" states in which they actively diffract, and "off" states in which they do not significantly diffract. For instance, a switchable DOE may comprise a layer of polymer dispersed liquid crystal, in which microdroplets comprise a diffraction pattern in a host medium, and the refractive index of the microdroplets may be switched to substantially match the refractive index of the host material (in which case the pattern does not appreciably diffract incident light) or the microdroplet may be switched to an index that does not match that of the host medium (in which case the pattern actively diffracts incident light).

In some embodiments, a camera assembly 630 (e.g., a digital camera, including visible light and infrared light cameras) may be provided to capture images of the eye 210 and/or tissue around the eye 210 to, e.g., detect user inputs and/or to monitor the physiological state of the user. In various embodiments, the camera assembly 630 can be a part of the inward facing cameras 114 of FIG. 2B. As used herein, a camera may be any image capture device. In some embodiments, the camera assembly 630 may include an image capture device and a light source to project light (e.g., infrared light) to the eye, which may then be reflected by the eye and detected by the image capture device. In some embodiments, the camera assembly 630 may be attached to the frame 80 (FIG. 2A) and may be in electrical communication with the processing modules 140 and/or 150, which may process image information from the camera assembly 630 to make various determinations regarding, e.g., the physiological state of the user, as discussed herein. It will be appreciated that information regarding the physiological state of user may be used to determine the behavioral or emotional state of the user. Examples of such information include movements of the user and/or facial expressions of the user. The behavioral or emotional state of the user may then be triangulated with collected environmental and/or virtual content data so as to determine relationships between the behavioral or emotional state, physiological state, and environmental or virtual content data. In some embodiments, one camera assembly 630 may be utilized for each eye, to separately monitor each eye.

Figure 7:
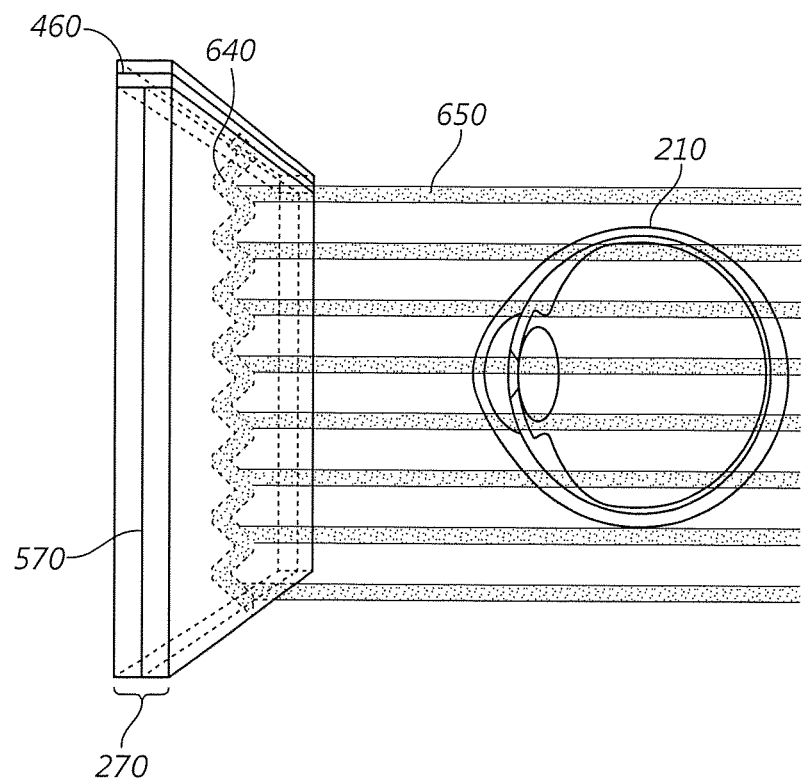
FIG. 7 illustrates an example of exit beams outputted by a waveguide.

With reference now to FIG. 7, an example of exit beams outputted by a waveguide is shown. One waveguide is illustrated, but it will be appreciated that other waveguides in the waveguide assembly 260 (FIG. 6) may function similarly, where the waveguide assembly 260 includes multiple waveguides. Light 640 is injected into the waveguide 270 at the input surface 460 of the waveguide 270 and propagates within the waveguide 270 by TIR. At points where the light 640 impinges on the DOE 570, a portion of the light exits the waveguide as exit beams 650. The exit beams 650 are illustrated as substantially parallel but, as discussed herein, they may also be redirected to propagate to the eye 210 at an angle (e.g., forming divergent exit beams), depending on the depth plane associated with the waveguide 270. It will be appreciated that substantially parallel exit beams may be indicative of a waveguide including out-coupling optical elements that out-couple light to form images that appear to be set on a depth plane at a large distance (e.g., optical infinity) from the eye 210. Other waveguides or other sets of out-coupling optical elements may output an exit beam pattern that is more divergent, which would require the eye 210 to accommodate to a closer distance to bring it into focus on the retina and would be interpreted by the brain as light from a distance closer to the eye 210 than optical infinity. In various embodiments, the exit beams 650 can correspond to the projection beam 124 of FIG. 2B.

Figure 8:
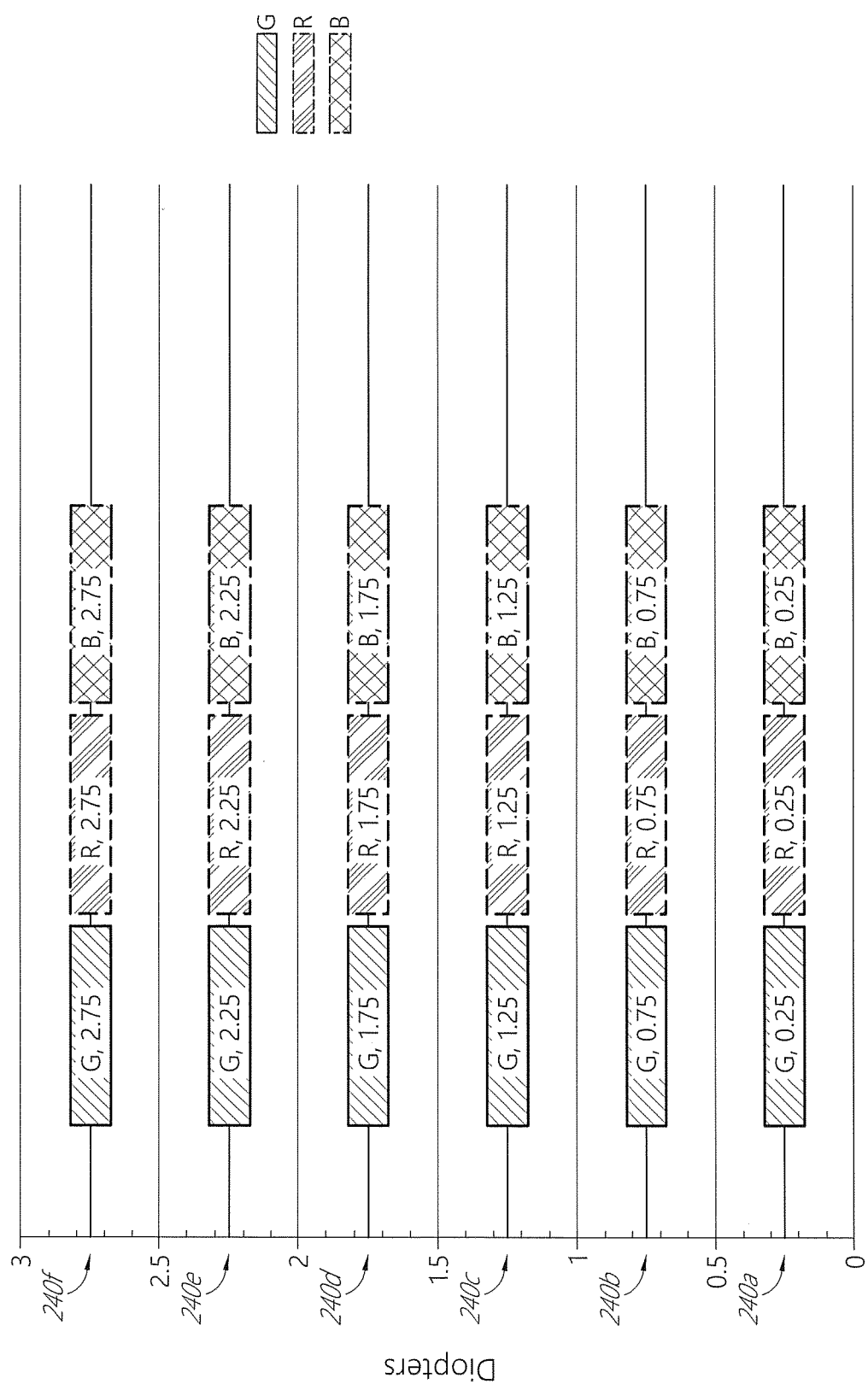
FIG. 8 illustrates an example of a stacked waveguide assembly in which each depth plane includes images formed using multiple different component colors.

In some embodiments, a full color image may be formed at each depth plane by overlaying images in each of the component colors, e.g., three or more component colors. FIG. 8 illustrates an example of a stacked waveguide assembly in which each depth plane includes images formed using multiple different component colors. The illustrated embodiment shows depth planes 240a-240f, although more or fewer depths are also contemplated. Each depth plane may have three or more component color images associated with it, including: a first image of a first color, G; a second image of a second color, R; and a third image of a third color, B. Different depth planes are indicated in the figure by different numbers for diopters (dpt) following the letters G, R, and B. Just as examples, the numbers following each of these letters indicate diopters (1/m), or inverse distance of the depth plane from a viewer, and each box in the figures represents an individual component color image. In some embodiments, to account for differences in the eye's focusing of light of different wavelengths, the exact placement of the depth planes for different component colors may vary. For example, different component color images for a given depth plane may be placed on depth planes corresponding to different distances from the user. Such an arrangement may increase visual acuity and user comfort and/or may decrease chromatic aberrations.

In some embodiments, light of each component color may be outputted by a single dedicated waveguide and, consequently, each depth plane may have multiple waveguides associated with it. In such embodiments, each box in the figures including the letters G, R, or B may be understood to represent an individual waveguide, and three waveguides may be provided per depth plane where three component color images are provided per depth plane. While the waveguides associated with each depth plane are shown adjacent to one another in this drawing for ease of description, it will be appreciated that, in a physical device, the waveguides may all be arranged in a stack with one waveguide per level. In some other embodiments, multiple component colors may be outputted by the same waveguide, such that, e.g., only a single waveguide may be provided per depth plane.

With continued reference to FIG. 8, in some embodiments, G is the color green, R is the color red, and B is the color blue. In some other embodiments, other colors associated with other wavelengths of light, including magenta and cyan, may be used in addition to or may replace one or more of red, green, or blue. In some embodiments, features 320, 330, 340, and 350 may be active or passive optical filters configured to block or selectively light from the ambient environment to the viewer's eyes.

It will be appreciated that references to a given color of light throughout this disclosure will be understood to encompass light of one or more wavelengths within a range of wavelengths of light that are perceived by a viewer as being of that given color. For example, red light may include light of one or more wavelengths in the range of about 620-780 nm, green light may include light of one or more wavelengths in the range of about 492-577 nm, and blue light may include light of one or more wavelengths in the range of about 435-493 nm.

In some embodiments, the light source 530 (FIG. 6) may be configured to emit light of one or more wavelengths outside the visual perception range of the viewer, for example, infrared and/or ultraviolet wavelengths. In addition, the in-coupling, out-coupling, and other light redirecting structures of the waveguides of the display 250 may be configured to direct and emit this light out of the display towards the user's eye 210, e.g., for imaging and/or user stimulation applications.

Figure 9A:
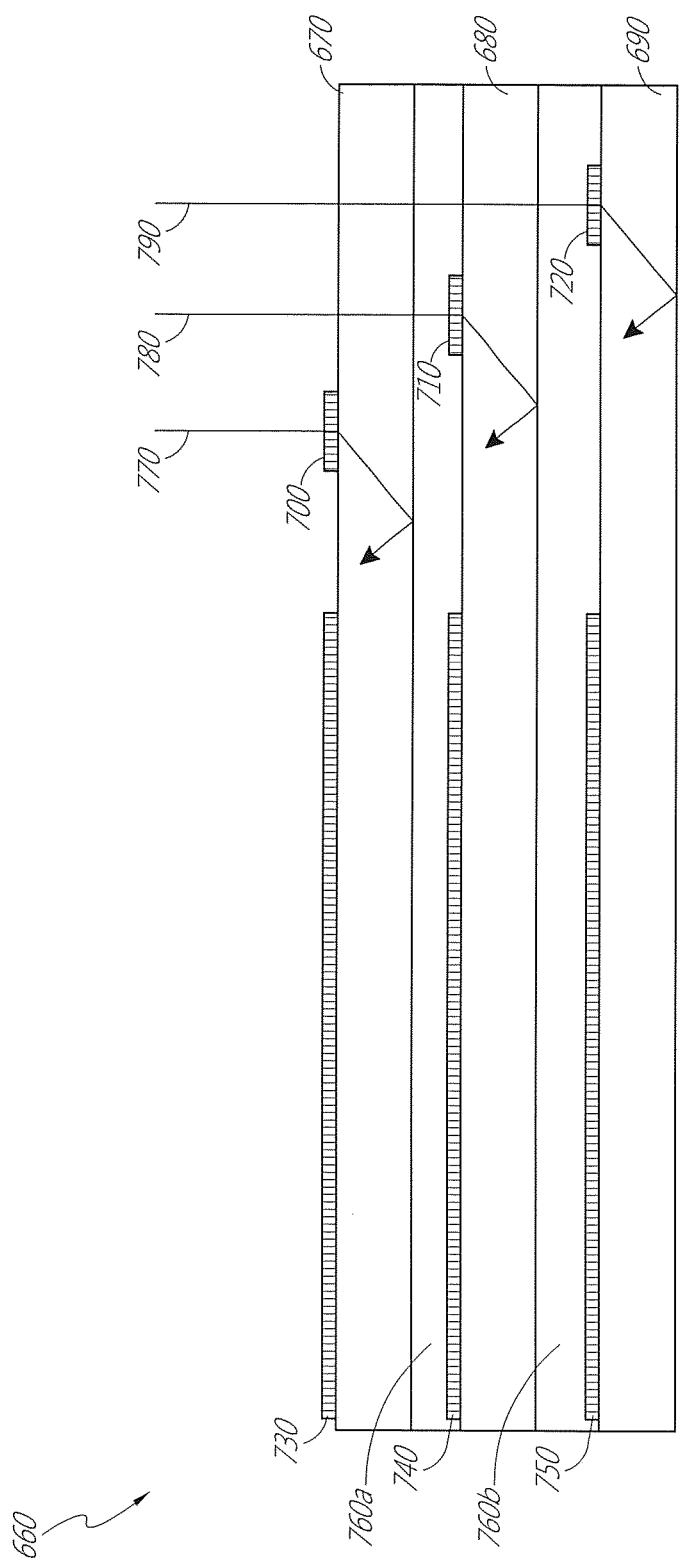
FIG. 9A illustrates a cross-sectional side view of an example of a set of stacked waveguides that each includes an in-coupling optical element.

With reference now to FIG. 9A, in some embodiments, light impinging on a waveguide may need to be redirected to in-couple that light into the waveguide. An in-coupling optical element may be used to redirect and in-couple the light into its corresponding waveguide. FIG. 9A illustrates a cross-sectional side view of an example of a plurality or set 660 of stacked waveguides that each includes an in-coupling optical element. The waveguides may each be configured to output light of one or more different wavelengths, or one or more different ranges of wavelengths. It will be appreciated that the stack 660 may correspond to the stack 260 (FIG. 6) and the illustrated waveguides of the stack 660 may correspond to part of the plurality of waveguides 270, 280, 290, 300, 310, except that light from one or more of the image injection devices 360, 370, 380, 390, 400 is injected into the waveguides from a position that requires light to be redirected for in-coupling.

The illustrated set 660 of stacked waveguides includes waveguides 670, 680, and 690. Each waveguide includes an associated in-coupling optical element (which may also be referred to as a light input area on the waveguide), with, e.g., in-coupling optical element 700 disposed on a major surface (e.g., an upper major surface) of waveguide 670, in-coupling optical element 710 disposed on a major surface (e.g., an upper major surface) of waveguide 680, and in-coupling optical element 720 disposed on a major surface (e.g., an upper major surface) of waveguide 690. In some embodiments, one or more of the in-coupling optical elements 700, 710, 720 may be disposed on the bottom major surface of the respective waveguide 670, 680, 690 (particularly where the one or more in-coupling optical elements are reflective, deflecting optical elements). As illustrated, the in-coupling optical elements 700, 710, 720 may be disposed on the upper major surface of their respective waveguide 670, 680, 690 (or the top of the next lower waveguide), particularly where those in-coupling optical elements are transmissive, deflecting optical elements. In some embodiments, the in-coupling optical elements 700, 710, 720 may be disposed in the body of the respective waveguide 670, 680, 690. In some embodiments, as discussed herein, the in-coupling optical elements 700, 710, 720 are wavelength selective, such that they selectively redirect one or more wavelengths of light, while transmitting other wavelengths of light. While illustrated on one side or corner of their respective waveguide 670, 680, 690, it will be appreciated that the in-coupling optical elements 700, 710, 720 may be disposed in other areas of their respective waveguide 670, 680, 690 in some embodiments.

As illustrated, the in-coupling optical elements 700, 710, 720 may be laterally offset from one another. In some embodiments, each in-coupling optical element may be offset such that it receives light without that light passing through another in-coupling optical element. For example, each in-coupling optical element 700, 710, 720 may be configured to receive light from a different image injection device 360, 370, 380, 390, and 400 as shown in FIG. 6, and may be separated (e.g., laterally spaced apart) from other in-coupling optical elements 700, 710, 720 such that it substantially does not receive light from the other ones of the in-coupling optical elements 700, 710, 720.

Each waveguide also includes associated light distributing elements, with, e.g., light distributing elements 730 disposed on a major surface (e.g., a top major surface) of waveguide 670, light distributing elements 740 disposed on a major surface (e.g., a top major surface) of waveguide 680, and light distributing elements 750 disposed on a major surface (e.g., a top major surface) of waveguide 690. In some other embodiments, the light distributing elements 730, 740, 750, may be disposed on a bottom major surface of associated waveguides 670, 680, 690, respectively. In some other embodiments, the light distributing elements 730, 740, 750, may be disposed on both top and bottom major surface of associated waveguides 670, 680, 690, respectively; or the light distributing elements 730, 740, 750, may be disposed on different ones of the top and bottom major surfaces in different associated waveguides 670, 680, 690, respectively.

The waveguides 670, 680, 690 may be spaced apart and separated by, e.g., gas, liquid, and/or solid layers of material. For example, as illustrated, layer 760a may separate waveguides 670 and 680; and layer 760b may separate waveguides 680 and 690. In some embodiments, the layers 760a and 760b are formed of low refractive index materials (that is, materials having a lower refractive index than the material forming the immediately adjacent one of waveguides 670, 680, 690). Preferably, the refractive index of the material forming the layers 760*a*, 760*b* is 0.05 or more, or 0.10 or less than the refractive index of the material forming the waveguides 670, 680, 690. Advantageously, the lower refractive index layers 760*a*, 760*b* may function as cladding layers that facilitate TIR of light through the waveguides 670, 680, 690 (e.g., TIR between the top and bottom major surfaces of each waveguide). In some embodiments, the layers 760*a*, 760*b* are formed of air. While not illustrated, it will be appreciated that the top and bottom of the illustrated set 660 of waveguides may include immediately neighboring cladding layers.

Preferably, for ease of manufacturing and other considerations, the material forming the waveguides 670, 680, 690 are similar or the same, and the material forming the layers 760*a*, 760*b* are similar or the same. In some embodiments, the material forming the waveguides 670, 680, 690 may be different between one or more waveguides, and/or the material forming the layers 760*a*, 760*b* may be different, while still holding to the various refractive index relationships noted above.

With continued reference to FIG. 9A, light rays 770, 780, 790 are incident on the set 660 of waveguides. It will be appreciated that the light rays 770, 780, 790 may be injected into the waveguides 670, 680, 690 by one or more image injection devices 360, 370, 380, 390, 400 (FIG. 6).

In some embodiments, the light rays 770, 780, 790 have different properties, e.g., different wavelengths or different ranges of wavelengths, which may correspond to different colors. The in-coupling optical elements 700, 710, 720 each deflect the incident light such that the light propagates through a respective one of the waveguides 670, 680, 690 by TIR.

For example, in-coupling optical element 700 may be configured to deflect ray 770, which has a first wavelength or range of wavelengths. Similarly, the transmitted ray 780 impinges on and is deflected by the in-coupling optical element 710, which is configured to deflect light of a second wavelength or range of wavelengths. Likewise, the ray 790 is deflected by the in-coupling optical element 720, which is configured to selectively deflect light of third wavelength or range of wavelengths.

With continued reference to FIG. 9A, the deflected light rays 770, 780, 790 are deflected so that they propagate through a corresponding waveguide 670, 680, 690; that is, the in-coupling optical elements 700, 710, 720 of each waveguide deflects light into that corresponding waveguide 670, 680, 690 to in-couple light into that corresponding waveguide. The light rays 770, 780, 790 are deflected at angles that cause the light to propagate through the respective waveguide 670, 680, 690 by TIR. The light rays 770, 780, 790 propagate through the respective waveguide 670, 680, 690 by TIR until impinging on the waveguide's corresponding light distributing elements 730, 740, 750.

Figure 9B:
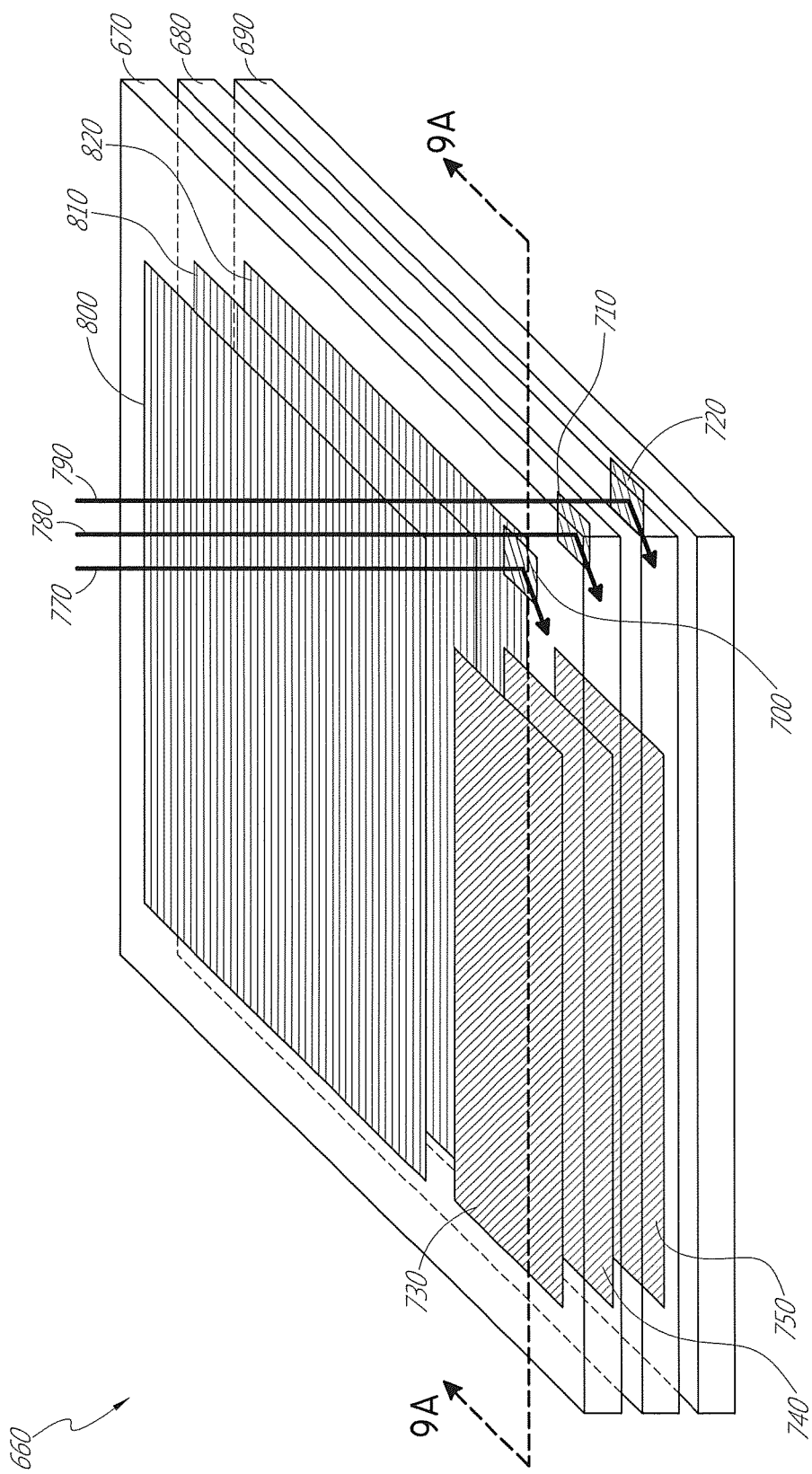
FIG. 9B illustrates a perspective view of an example of the plurality of stacked waveguides of FIG. 9A.

With reference now to FIG. 9B, a perspective view of an example of the plurality of stacked waveguides of FIG. 9A is illustrated. As noted above, the in-coupled light rays 770, 780, 790, are deflected by the in-coupling optical elements 700, 710, 720, respectively, and then propagate by TIR within the waveguides 670, 680, 690, respectively. The light rays 770, 780, 790 then impinge on the light distributing elements 730, 740, 750, respectively. The light distributing elements 730, 740, 750 deflect the light rays 770, 780, 790 so that they propagate towards the out-coupling optical elements 800, 810, 820, respectively.

In some embodiments, the light distributing elements 730, 740, 750 are orthogonal pupil expanders (OPE's). In some embodiments, the OPE's both deflect or distribute light to the out-coupling optical elements 800, 810, 820 and also increase the beam or spot size of this light as it propagates to the out-coupling optical elements. In some embodiments, e.g., where the beam size is already of a desired size, the light distributing elements 730, 740, 750 may be omitted and the in-coupling optical elements 700, 710, 720 may be configured to deflect light directly to the out-coupling optical elements 800, 810, 820. For example, with reference to FIG. 9A, the light distributing elements 730, 740, 750 may be replaced with out-coupling optical elements 800, 810, 820, respectively. In some embodiments, the out-coupling optical elements 800, 810, 820 are exit pupils (EP's) or exit pupil expanders (EPE's) that direct light in a viewer's eye 210 (FIG. 7). It will be appreciated that the OPE's may be configured to increase the dimensions of the eye box in at least one axis and the EPE's may be to increase the eye box in an axis crossing, e.g., orthogonal to, the axis of the OPEs.

Accordingly, with reference to FIGS. 9A and 9B, in some embodiments, the set 660 of waveguides includes waveguides 670, 680, 690; in-coupling optical elements 700, 710, 720; light distributing elements (e.g., OPE's) 730, 740, 750; and out-coupling optical elements (e.g., EP's) 800, 810, 820 for each component color. The waveguides 670, 680, 690 may be stacked with an air gap/cladding layer between each one. The in-coupling optical elements 700, 710, 720 redirect or deflect incident light (with different in-coupling optical elements receiving light of different wavelengths) into its waveguide. The light then propagates at an angle which will result in TIR within the respective waveguide 670, 680, 690. In the example shown, light ray 770 (e.g., blue light) is deflected by the first in-coupling optical element 700, and then continues to bounce down the waveguide, interacting with the light distributing element (e.g., OPE's) 730 and then the out-coupling optical element (e.g., EPs) 800, in a manner described earlier. The light rays 780 and 790 (e.g., green and red light, respectively) will pass through the waveguide 670, with light ray 780 impinging on and being deflected by in-coupling optical element 710. The light ray 780 then bounces down the waveguide 680 via TIR, proceeding on to its light distributing element (e.g., OPEs) 740 and then the out-coupling optical element (e.g., EP's) 810. Finally, light ray 790 (e.g., red light) passes through the waveguide 690 to impinge on the light in-coupling optical elements 720 of the waveguide 690. The light in-coupling optical elements 720 deflect the light ray 790 such that the light ray propagates to light distributing element (e.g., OPEs) 750 by TIR, and then to the out-coupling optical element (e.g., EPs) 820 by TIR. The out-coupling optical element 820 then finally out-couples the light ray 790 to the viewer, who also receives the out-coupled light from the other waveguides 670, 680.

Figure 9C:
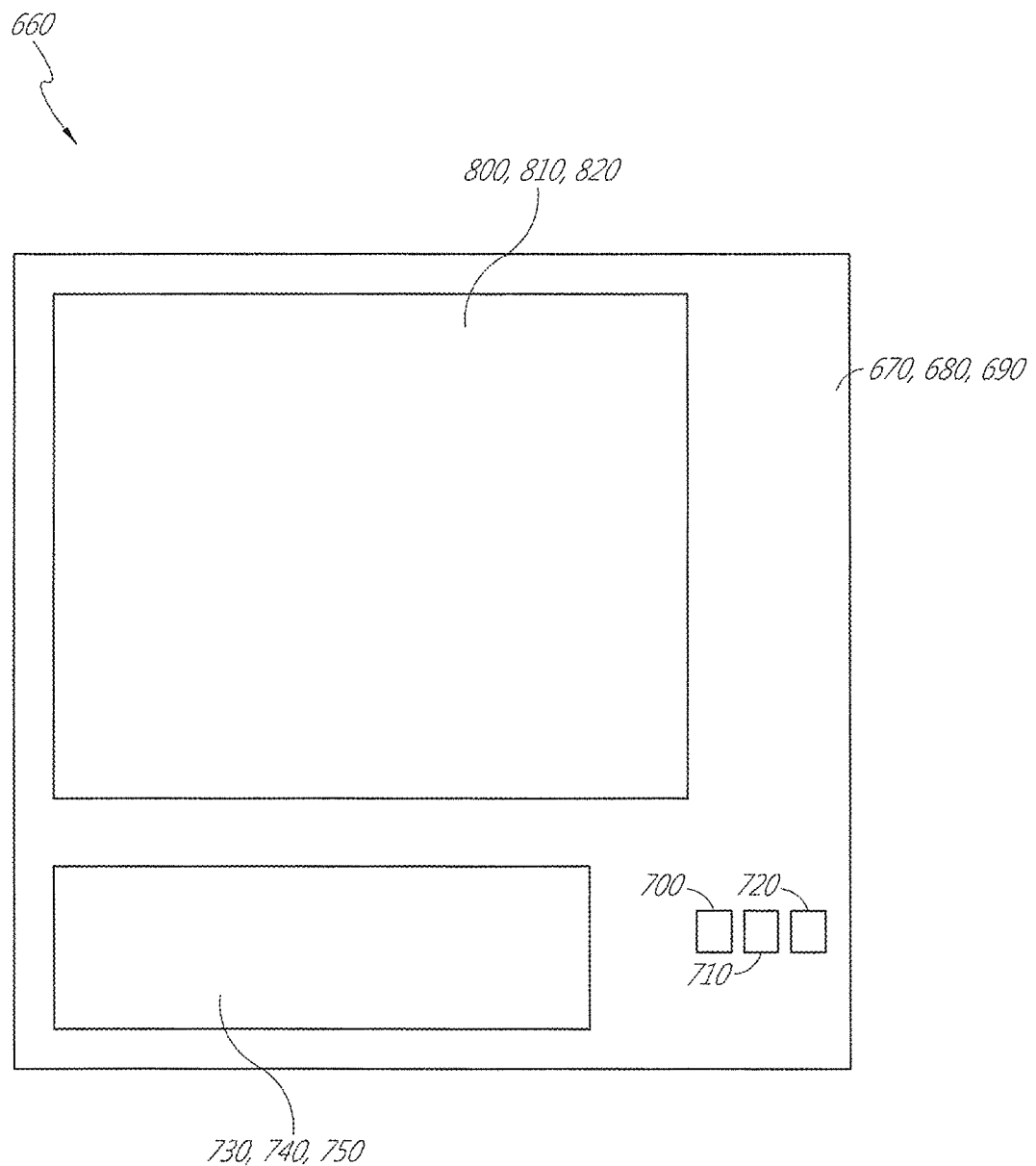
FIG. 9C illustrates a top-down plan view of an example of the plurality of stacked waveguides of FIGS. 9A and 9B.

FIG. 9C illustrates a top-down plan view of an example of the plurality of stacked waveguides of FIGS. 9A and 9B. As illustrated, the waveguides 670, 680, 690, along with each waveguide's associated light distributing element 730, 740, 750 and associated out-coupling optical element 800, 810, 820, may be vertically aligned. However, as discussed herein, the in-coupling optical elements 700, 710, 720 are not vertically aligned; rather, the in-coupling optical elements are preferably non-overlapping (e.g., laterally spaced apart as seen in the top-down view). As discussed further herein, this nonoverlapping spatial arrangement facilitates the injection of light from different resources into different waveguides on a one-to-one basis, thereby allowing a specific light source to be uniquely coupled to a specific waveguide. In some embodiments, arrangements including nonoverlapping spatially-separated in-coupling optical elements may be referred to as a shifted pupil system, and the in-coupling optical elements within these arrangements may correspond to sub pupils.

Display Systems with Regions of Variable Light Transmission

In embodiments of the display system 60 configured as augmented reality and/or virtual reality devices, contrast, brightness and/or clarity of the augmented reality content and/or virtual reality content that is displayed can be improved in a dim or dimmer environment. For example, contrast, brightness and/or clarity of augmented reality content and/or virtual reality content can be reduced when embodiments of the display system 60 configured as augmented reality and/or virtual reality devices are viewed outside in bright sunlight, in brightly lit rooms, and/or in rainy/foggy environments with a lot of glare. Accordingly, it is advantageous if the intensity of ambient light transmitted through a portion of the display 70 can be reduced when that portion of the display 70 has glare and/or when the ambient light conditions over that portion of the display 70 are bright to improve clarity of vision. In various embodiments, reducing the intensity of ambient light through a portion of the display 70 that is in an environment with bright ambient light conditions can advantageously improve the user's visual experience.

In some embodiments, the display system 60 can be configured to measure the light intensity of bright ambient light sources, such as, for example, but not limited to, desk lamps, overhead lights, street lights, car head lights, sun or combinations thereof and attenuate the amount of light transmitted through one or more portions of the display 70 on which light from the bright ambient light sources is incident. The amount of light from the bright ambient light sources that is transmitted through the one or more portions of the display 70 can be reduced by changing the transmissivity of the one or more portions of the display 70. For example, the one or more portions of the display 70 may be darkened to reduce the amount of light from the bright ambient light sources that is transmitted through the one or more portions. In some implementations, the display 70 can comprise one or more optical elements such as switchable light deflectors (e.g., optical zone plate, a diffractive optical element or a refractive optical element) that can be switched to deflect some of the light from the bright ambient light sources. The light may be deflected so as to reduce the amount of light that is incident on the eye or on the center of the retina (e.g., fovea) and in the center of the field of view of the viewer. As a result of deflecting light, the brightness the ambient light sources appears to the viewer can be reduced and the contrast ratio of the virtual reality content can be increased. In various implementations, the transmissivity of light through the one or more portions of the display 70 need not be reduced to an amount that the bright ambient light sources are not visible through the display. Instead, the transmissivity of light through the one or more portions of the display 70 can be reduced to a level that allows visibility of the virtual reality content with sufficient visual acuity and also allows visibility of the bright ambient light sources.

Various embodiments of the display system 60 can comprise a forward facing camera/ambient light sensor that is configured to capture an image of a scene in the field of view (FOV) and determine the location and intensity of various bright light sources in the scene. The forward facing camera can be associated with the display system 60. For example, the forward facing camera can be mounted on the display 70. A relationship between the FOV of the camera and the FOV of the user through the display 70 can be determined. One or more portions of the display 70 corresponding to the determined location of the bright light sources in the scene that are configured to have reduced light transmissivity can be determined by determining the location of one or more bright light sources in the FOV of the image captured by the camera and identifying the locations of the display 70 corresponding to those bright light sources.

A method of determining the location of the bright light sources in the scene and/or the intensity of the bright light sources in the scene can be similar to the method of updating one or more settings of a content capture device using automatic exposure control (AEC) described in U.S. patent application Ser. No. 15/841,043, filed on Dec. 13, 2017, which is incorporated by reference herein in its entirety. Similar to the method illustrated in FIG. 1A and described in paragraphs [0060]-[0065] of U.S. patent application Ser. No. 15/841,043, filed on Dec. 13, 2017, which are incorporated by reference herein, the image captured by the camera/ambient light sensor can be divided into a plurality of pixel groups (e.g., 96 pixel groups, 120 pixel groups, 144 pixel groups, etc.). An average luma value can be computed for each pixel group as described in paragraph [0065] of U.S. patent application Ser. No. 15/841,043, filed on Dec. 13, 2017, which is incorporated by reference herein. In some examples, an average luma pixel group value may be computed by accumulating luma values for each pixel of a pixel group. In such examples, luma values may represent the brightness of an image (e.g., an achromatic portion of an image or a grey scale image). Accordingly, a luma value may be a representation of an image without a color component. As another example, in a YUV colorspace, a luma value may be the Y. In some examples, a luma value is a weighted sum of gamma-compressed RGB components of an image. In such examples, the luma value may be referred to as gamma-corrected luma. In some examples, accumulation may be performed by software or hardware by adding up luma values for each pixel of the pixel group. In some implementations, once the luma values for a pixel group are accumulated, the total number may be divided by the number of pixels in the pixel group to compute an average luma pixel group value for the pixel group. This process may be repeated for each pixel group in the image.

If the image captured by the camera is a grayscale image, then the pixel value associated with the plurality of pixel groups of the grayscale image correspond to the average luma value. In some implementations, color images captured by the ambient light sensor can be converted to YUV image format and the luma value corresponding to the Y component of the YUV image can be determined.

In some implementations, one or more bright spots on the display 70 can be identified to correspond to one or more saturation regions of the image captured by the ambient light sensor. For example, one or more bright spots on the display 70 that corresponds to the position of the bright light sources in the scene can be determined based on a maximum allowable luma value difference between adjacent pixels, or adjacent groups of pixels. The maximum allowable luma value difference between adjacent pixels can be calculated in different ways. For example, in one method pixels that have relative pixel values within a certain threshold of each other can be grouped together. Another method of grouping the relative pixel values relies on adaptive k-means clustering algorithm which outputs a set of clusters with luma values above a certain threshold level. In some implementations, saturation region can correspond to the portion of the image having luma value above a threshold value. The threshold value can, for example, be 220 for an 8-bit image ranging from 0 for black to 255 for white. The portions of the display 70 that correspond to the portions of the image having luma values above a certain threshold can be selectively occluded to reduce transmissivity of the light from the bright light sources. Other approaches may be employed.

In some embodiments, the display system 60 can comprise an electronic processor (e.g., local processing & data module 140 and/or remote processing module 150) that is configured to reduce the amount of light transmitted through the portions of the display 70 that receive light from the locations of the ambient environment that have higher light intensity than an average light intensity of the ambient environment. In this manner, the intensity of light transmitted through display 70 can be reduced in portions of the display 70 that receive the most ambient light. Additionally, the electronic processor can be configured to determine the portions of the display 70 where the virtual reality content is displayed and reduce the amount of ambient light transmitted through those portions to increase the relative brightness of the virtual reality content.

To facilitate selectively reducing the transmissivity of light through one or more portions of the display 70, the display 70 can be configured as a pixelated display. For example, the surface of the display 70 can comprise a plurality of electronically addressable pixels that can be configured to vary the amount of light transmitted therethrough. In some implementations, the plurality of electronically addressable pixels can comprise a plurality of spatial light modulators. In some implementations, the display 70 can comprise an occlusion mask a the plurality of electronically addressable pixels. The occlusion mask can comprise a plurality of mask elements, each mask element being associated with one or more of the plurality of addressable pixels. The plurality of mask elements can have different values associated with the different values of transmissivity through the plurality of electronically addressable pixels. The electronic processor (e.g., local processing & data module 140 and/or remote processing module 150) can be configured to selectively reduce the amount of light transmitted through one or more of the plurality of pixels to reduce brightness of ambient light sources and/or to improve contrast ratio of the virtual reality content.

As discussed above, the display 70 can include a display lens 106. In various embodiments, the display lens 106 can be a unitary lens positioned in front of both eyes of the user 90. The unitary lens can have ocular regions positioned in front of each eye through which the user can view the surrounding environment. In some embodiments, the display lens 106 can comprise two lens elements, each lens element positioned in front of each eye of the user 90. Each lens element can have an ocular region through which the user can view the surrounding.

Various embodiments described herein are configured to reduce intensity of light transmitted through one or more portions of the display lens 106, such as, for example by absorbing some of the ambient light incident on the portion of the display lens 106 and/or by scattering/refracting/diffracting some of the ambient light incident on the portion(s) of the display lens 106 away from the pupil of the eye. Additionally, in embodiments of the display lens 106 comprising two lens elements positioned in front of each eye respectively, the intensity of ambient light transmitted through only one of the lens elements (or a portion or portions thereof) may be reduced. As another example, the intensity of ambient light transmitted through a portion of one or both the ocular regions of the display lens 106 is reduced while the intensity of ambient light transmitted through the remainder of the display lens 106 is not reduced (or is reduced but by a lesser amount). As yet another example, the intensity of ambient light transmitted through a first portion of the display lens 106 is reduced while the intensity of ambient light transmitted through a second portion of the display lens is not reduced. In contrast to sunglasses that darken uniformly in bright sunlight and lighten uniformly indoors, various embodiments of the display lens 106 are configured to darken or lighten non-uniformly. For example, the display lens 106 may darken partially, e.g., only part of the lens 106 may darken. As another example, the display lens 106 may darken by different amounts in different parts of the lens. Additionally, in various embodiments of the system 60, partial darkening of portions of the display lens 106 may be achieved in response to a stimulus provided by the display system (e.g., optical stimulus provided the light emitting module 134, electrical stimulus provided by the electrical system 132, thermal energy provided by the thermal source 136 and/or sonic/ultrasonic energy provided by the sonic/ultrasonic transducer 138) based on information obtained by one or more components that sense the user's environment such as, for example, light sensor 128, the sensor assembly 126, the outward facing cameras 112 and/or inward facing cameras 114 in conjunction with data from an associated cloud computing resource. In various embodiments of the display system 60, darkening or lightening of the display lens 106 need not occur automatically in response to ambient light conditions but in response to a stimulus provided by the display system (e.g., optical stimulus provided by the light emitting module 134, electrical stimulus provided by the electrical system 132, thermal energy provided by the thermal source 136 and/or sonic/ultrasonic energy provided by the sonic/ultrasonic transducer 138) based on environmental information obtained by one or more cameras/sensors of the system 60 with/without data from an associated cloud computing resource. In various embodiments, at least one portion of the display lens 106 can be configured to transmit between about 1%-100% of incident ambient light. For example, the at least one portion of the display lens 106 can be configured to transmit between about 5%-90% of incident ambient light, between about 10%-80% of incident ambient light, between about 15%-75% of incident ambient light, between about 20%-70% of incident ambient light, between about 25%-60% of incident ambient light, between about 30%-50% of incident ambient light, or any value in these ranges and/or sub-ranges.

The display lens 106 can comprise at least one variable optical material (e.g., organic molecules, proteins, photochromic materials, electrochromic materials, silver compounds such as, for example, silver halide or silver chloride molecules, aerosols, hydrocolloids, etc.) that can be activated using thermal, sonic/ultrasonic, optical and/or electrical stimulus to vary at least one of: the intensity of ambient light transmitted through the display lens 106, spectral content of ambient light transmitted through the display lens 106, or the optical path of the ambient light transmitted through the display lens 106 (e.g., by diffraction, by scattering, by refraction or by changing the refractive index of the variable optical element). The variable optical material may comprise a layer of molecules or a plurality of layers of molecules. In various embodiments, the at least one variable optical material can comprise protein based electroactive materials that respond to an electrical stimulus (e.g., a voltage signal and/or a current signal) provided by the display system 60 to vary at least one of: the intensity of ambient light transmitted through the display lens 106, spectral content of ambient light transmitted through the display lens 106, or the optical path of the ambient light transmitted through the display lens 106. For example, in response to an electrical stimulus provided by the display system 60, the protein based electroactive materials can move, expand, contract, twist, rotate, adhere together or move away from each other to vary at least one of: the intensity of ambient light transmitted through the display lens 106, spectral content of ambient light transmitted through the display lens 106, or the optical path of the ambient light transmitted through the display lens 106. In some embodiments, the at least one variable optical material can comprise organic materials (e.g., oxazines and/or naphthopyrans) that vary at least one of: the intensity of ambient light transmitted through the display lens 106, spectral content of ambient light transmitted through the display lens 106, or the optical path of the ambient light transmitted through the display lens 106 in response to an optical stimulus provided by the display system 60. The molecules of the organic materials can be configured to change their size and/or shape when irradiated with light of certain frequencies or wavelengths (e.g., UV light). For example, the organic materials can be configured to expand and absorb more light (therefore reducing intensity of light transmitted to the user) when irradiated with light of certain frequencies. As another example, the molecules of the organic materials can be configured to move, shrink, twist, rotate, clump together or move away from each other to vary the intensity of light transmitted through the display lens 106 in response to an optical stimulus. The molecules of the organic materials can vary the intensity of light transmitted through the display lens 106 by absorbing a portion of the light transmitted through the display lens 106, by changing the color of the display lens 106 and/or by diffracting/refracting/scattering portion of the light transmitted away from the display lens 106. As discussed above, the variable optical material may comprise a layer of molecules or a plurality of layers of molecules.

In various embodiments, the at least one variable optical material can comprise one or more molecules that are bound with certain chemicals that can be configured to vary the transmissivity of light in response to a stimulus provided by the system 60. The chemicals bound to the one or more molecules can be configured to vary intensity of incoming ambient light, direction of incoming ambient light and/or spectral content of incoming ambient light when irradiated by specific wavelengths of light (e.g., UV, infrared and/or one or more wavelengths in the visible spectrum).

Because the at least one variable optical material (e.g., photoreactive and/or electroactive materials) are configured to vary at least one of: the intensity of ambient light transmitted through the display lens 106, spectral content of ambient light transmitted through the display lens 106, or the optical path of the ambient light transmitted through the display lens 106 in response to stimulus provided by the display system 60, the location of the desired portion of the display lens 106 through which the intensity of incoming ambient light, direction of incoming ambient light and/or spectral content of incoming ambient light is changed (e.g., by absorption in the desired portion, by changing color of the desired portion and/or by diffraction/refraction/scattering of the ambient light away from the desired portion), the duration of time that the desired portion of the display lens 106 is configured to change intensity of incoming ambient light, direction of incoming ambient light and/or spectral content of incoming ambient light and the speed at which the desired portion of the display lens 106 is darkened or lightened can be controlled (e.g., precisely controlled).

Additionally, the distribution of the at least one variable optical material across the surface of the display lens 106 can be tailored to meet certain requirements/functions. In some embodiments, the at least one variable optical material can be distributed uniformly across the surface of the display lens 106. In some other embodiments, the at least one variable optical material can be distributed unevenly across the surface of the display lens 106 such that portions of the display lens 106 can have higher density of the at least one variable optical material as compared to other portions of the display lens 106. In some embodiments, the density of the at least one variable optical material in portions of the ocular regions of the display lens 106 may be greater than in portions of the non-ocular regions (e.g., regions of the display lens corresponding to the temples, nose bridge, eye orbitals and other non-ocular portions of the user's face) which the user cannot see through. In some embodiments, certain regions of the display lens 106 (e.g., the non-ocular regions) can be devoid of the at least one variable optical material since it may not be necessary to vary at least one of: the intensity of the ambient light, spectral content of the ambient light, or the optical path of the ambient light in those regions.

Various embodiments of the display lens 106 can comprise a plurality of layers, each layer including variable optical materials that vary at least one of: the intensity of ambient light, spectral content of ambient light, or the optical path of the ambient light in response to a stimulus provided by the display system 60. The materials of the plurality of layers may be configured to act on different wavelengths of the incoming ambient light. For example, the materials of the plurality of layers may attenuate different wavelengths of the incoming ambient light by different amounts. As another example, the materials of the plurality of layers may absorb different wavelengths of the incoming ambient light by different amounts. As yet another example, the materials of the plurality of layers may diffract/scatter/refract different wavelengths of the incoming ambient light by different amounts.

Accordingly, some embodiments of the display lens 106 can include a first layer comprising a first variable optical material that is configured to attenuate (e.g., by absorption, diffraction, refraction, reflection or scattering) red light in response to a stimulus provided by the display system 60, a second layer comprising a second variable optical material that is configured to attenuate (e.g., by absorption, diffraction, refraction, reflection or scattering) green light in response to a stimulus provided by the display system 60, a third layer comprising a third variable optical material that is configured to attenuate (e.g., by absorption, diffraction, refraction, reflection or scattering) blue light in response to a stimulus provided by the display system 60, a fourth layer comprising a fourth variable optical material that is configured to attenuate (e.g., by absorption, diffraction, refraction, reflection or scattering) ultraviolet light in response to a stimulus provided by the display system 60 and/or a fifth layer comprising a fifth variable optical material that is configured to attenuate (e.g., by absorption, diffraction, refraction, reflection or scattering) infrared light in response to a stimulus provided by the display system 60. A subset of theses layers can alternatively be included in the display lens or display system. For example first, second, and third layers for attenuating, red, green, and blue light respectively. In such embodiments, thermal, sonic/ultrasonic, optical or electrical stimulus can be provided to one or more of the plurality of layers to attenuate (e.g., by absorption, diffraction, refraction, reflection or scattering) specific wavelengths of light based on environmental information obtained by one or more cameras/sensors of the system 60 with/without data from an associated cloud computing resource.

In various embodiments, groups of variable optical materials having the same chemical/physical property can be individually activated to perform a variety of functions without activating other groups of variable optical materials having different chemical/physical property. In various embodiments, the variable optical materials that change at least one of: intensity of ambient light, spectral content of ambient light or optical path of ambient light incident on the display lens 106 can only be provided in certain portions of the display lens 106 (e.g., the ocular portions of the display lens 106, a part of the ocular portions of the display lens 106, only one of the ocular portions of the display lens 106, etc.). In some such embodiments, the portions of the display lens 106 comprising the variable optical materials may automatically darken/lighten in the presence/absence of sunlight without requiring any additional stimulus from the display system 60.

In various embodiments, the variable optical materials can be integrated with the display lens 106. However, in some other embodiments, the variable optical materials may be included in an add-on device that can be attached or detached to the display lens 106. The embodiments of display lenses integrated with the variable optical materials and/or add-on devices including the variable optical materials can be configured to be activated by a small amount of activation energy (e.g., thermal, sonic/ultrasonic, optical and/or electrical energy). In some cases, after activation, the physical and/or chemical changes of the molecules of variable optical materials that changes at least one of: intensity of ambient light, spectral content of ambient light or optical path of ambient light may occur without requiring any additional amount of energy. The physical and/or chemical changes of the variable optical materials may be maintained until the variable optical materials are deactivated by providing deactivation energy (e.g., thermal, sonic/ultrasonic, optical and/or electrical energy).

As discussed above, in some implementations the display 70 can be configured as a pixelated display. For example, the surface of the display 70 can comprise a plurality of electronically addressable pixels that can vary the amount of light transmitted therethrough in response to an electrical or an optical stimulus. In some implementations, the plurality of electronically addressable pixels can comprise a plurality of spatial light modulators. In some implementations, the display 70 can comprise an occlusion mask comprising a plurality of mask elements associated with the plurality of electronically addressable pixels. The electronic processor (e.g., local processing & data module 140 and/or remote processing module 150) can be configured to provide an electrical or an optical signal to selectively reduce the amount of light transmitted through one or more of the plurality of pixels to reduce brightness of ambient light sources and/or to improve contrast ratio of the virtual reality content.

The following examples illustrate the advantages and the various operational characteristics of an embodiment of the display system 60 that is configured to alter at least one of: intensity of ambient light, spectral content of ambient light and/or direction of ambient light incident on the display 70 as described above. Consider an embodiment of the display system 60 comprising variable optical materials (either integrated with the display lens 106 of the display system 60 or included in an add-on device) that is worn by the user 90. As the user moves from a low ambient light condition (e.g., indoors) to a bright environment (e.g., outdoors), the sensors assemblies (e.g., light sensors, outwards facing cameras, inward facing cameras, etc.) of the display system 60 will detect the change in the ambient light condition. The sensor assemblies may be configured to detect change in ambient light condition by detecting changes in the intensity of ambient light as well as by detecting changes in the environment using location-specific information (e.g., information obtained by a GPS, a compass and/or information obtained from an associated cloud computing resource), information regarding the surrounding environment obtained using object recognition algorithms to determine trees/park, buildings, rooms, etc., temperature sensors, etc. In addition to determining a change in the intensity of ambient light condition, the sensor assemblies may be configured to determine the spectral characteristics of the incident light as well. The sensor assemblies may be configured to determine the intensity/spectral characteristic of ambient light that is incident on different portions of the display lens 106. The sensor assemblies may include sensors having filters and/or specific spectral responses to determine the spectral characteristics of ambient or incident light. Accordingly, in certain embodiments, the sensor assemblies may be configured to locate and identify positions of various ambient light sources in the real world visible to the user through the display 70 as well as identify portions of the display 70 and/or the display lens 106 that are aligned with the ambient light sources for a particular position of the user's head. Once the various portions of the display lens 106 that coincide with the ambient light sources in the real world is known, the system 60 can provide optical, electrical, thermal and/or sonic/ultrasonic stimulus to different portions of the display lens 106 to cause a portion of the incident ambient light to be absorbed, deflected, refracted, scattered and/or reflected such that the amount of ambient light transmitted through that portions of the display lens 106 that coincide with the ambient light sources in the real world is reduced or otherwise altered. In this manner, the amount of ambient light transmitted through the display lens 106 can be varied across the surface of the display lens 106 depending on the environmental conditions. For example, consider that the user 90 is outside in the morning or evening hours when sunlight is incident on the display lens from one side of the user such that the amount of ambient light incident on the surface of the display lens 106 is not uniform. In such embodiments, the system 60 can be configured to transmit a greater amount of light through one portion of the display lens 106 than the amount of light transmitted through another portion of the display lens 106. In various embodiments, the amount of light transmitted through one portion of the display lens 106 can be about 1%-100% (e.g., 2%-95%, 5%-90%, 7%-80%, 10%-75%, 15%-50%, 20%-60%, 30%-85%, etc.) greater than the amount of light transmitted through another portion of the display lens 106.

In various embodiments, the information obtained from the various sensors and/or camera assemblies can be sent to the local processing & data module 140 and/or the remote processing module 150 for processing. The local processing & data module 140 and/or the remote processing module 150 can determine one or more locations of the display lens 106 that are aligned with different ambient light sources by processing the information obtained from the various sensors and/or camera assemblies. In some embodiments, the local processing & data module 140 and/or the remote processing module 150 can store the position of various objects in the real world with respect to the display device and/or the user's head/eyes in a database. The database can be updated or provide information in real time or in near real time as the objects in the surrounding real world appear to move with respect to the display device and/or the user's head/eyes as the user moves his/her head. The database can be updated or provide information in real time or in near real time regarding position with respect to the display device and/or the user's head/eyes of new objects from the surrounding real world that come into the user's field of view as the user moves his/her head. In various embodiments, the local processing & data module 140 and/or the remote processing module 150 can be configured to determine the intensity/spectral characteristics of the ambient light sources that appear to be aligned with different portions of the display lens 106 when viewed through the display lens 106. The local processing & data module 140 and/or the remote processing module 150 can be configured to reduce the amount of ambient light transmitted through the portions of the display lens 106 when viewed through the display lens 106 that appear to be aligned with the ambient light sources. The local processing & data module 140 and/or the remote processing module 150 can send signals that can trigger the light emitting module 134, the electrical system 132, the thermal source 136 and/or the sonic/ultrasonic transducers 138 to provide the appropriate stimulus to activate the variable optical element in the different portions of the display lens 106 to attenuate ambient light in those portions by the appropriate amount. As discussed above, the light through different portions of the display lens 106 can be attenuated by same or different amounts depending on the intensity/spectral characteristics of the light from the ambient light sources that appear to be aligned with those portions. This can be advantageous when light is incident on the user's eyes from one side, such as, for example from a desk lamp positioned on one side of the user, sunlight in the morning or evening hours, or objects in the real world seen through different portions of the display lens 106 that produce different amounts of glare.

In various embodiments, the system 60 can be configured to obtain information about the environment continuously or substantially continuously. For example, the system 60 can be configured to obtain information about the environment from the various cameras/sensor assemblies at 1-30 microsecond intervals, at 100-500 microsecond intervals, 400 microseconds-1 millisecond intervals, at 1-30 millisecond intervals, at 20-100 millisecond intervals, at 50-500 millisecond intervals, at 400 millisecond-1 second intervals, at 1-5 second intervals, or at any values in these ranges or sub-ranges or any combinations thereof. The local processing & data module 140 and/or the remote processing module 150 can be configured to process the information obtained from the various cameras/sensor assemblies of the system 60 and send signals that can trigger the light emitting module 134, the electrical system 132, the thermal source 136 and/or the sonic/ultrasonic transducers 138 to provide the required stimulus to activate the variable optical element in the different portions of the display lens 106 in real-time or near real-time, for example, such that the user experience is maintained as the environmental conditions change.

For example, in various embodiments, the light sensors 128 can be configured to sense intensity and/or spectral characteristics of ambient light incident on the display lens. Additionally, the outward facing cameras, the inward facing cameras and other sensor assemblies can be configured to obtain information about the surrounding world viewable to the user through the display lens 106 that can help in identifying different sources of ambient light and/or glare producing objects in the real world as well as their position with respect to the display 70, and/or the display lens 106 and/or the user's eye. In various embodiments, the display system 60 can also be configured to identify the nature of the ambient light source that appears to be aligned with different portions of the display lens 106 (e.g., sunlight, fluorescent light, incandescent light, LED light, candle). Once the system 60 has identified the position of the various ambient light sources with respect to the display 70 and/or display lens 106 and/or the user's eye, it can determine portions of the display 70 and/or display lens 106 whose light transmission characteristics should be changed in order to maintain/improve user's visual experience. The system 60 can provide a stimulus to the determined portions of the display lens 106 to attenuate light transmitted through those portions in real time or near real time and/or to change the direction or spectral characteristics of light transmitted through those portions in order, for example, to maintain/improve user's visual experience. In this manner, the user's visual experience need not be substantially compromised as a result of glare or intensity changes across the surface of the display lens 106.

In various embodiments, the system 60 may be configured to store maps of locations frequently visited by the user in a data repository accessible by the local processing & data module 140 and/or the remote processing module 150. The stored map for one or more locations frequently visited by the user can include positions of ambient light sources (e.g., street lights, porch lights, traffic lights, etc.). Information about the intensity and/or spectral content of light from the ambient light sources at one or more locations frequently visited can also be stored in the data repository. Information about how the light transmission characteristics of various portions of the display lens 106 should be changed at various times of the day, night and/or year may be predetermined for one or more locations frequently visited by the user and stored in the data repository as well. For example, for a location frequently visited by the user, information about how the light transmission capability of different portions of the display lens 106 that appear to be aligned with different ambient light sources at that location should be changed during daytime can be stored in the data repository. As another example, for a location frequently visited by the user, information about how the light transmission capability of different portions of the display lens 106 that appear to be aligned with different ambient light sources at that location should be changed during nighttime (or any other time) can be stored in the data repository. As yet another example, for a location frequently visited by the user, information about how the light transmission capability of different portions of the display lens 106 that appear to be aligned with different ambient light sources at that location should be changed during daytime in summer can be stored in the data repository. As another example, for a location frequently visited by the user, information about how the light transmission capability of different portions of the display lens 106 that appear to be aligned with different ambient light sources at that location should be changed during daytime in winter can be stored in the data repository. The locations and characteristics (e.g., size, shape, brightness, color etc.) of the different light source at the different locations can also be recorded and stored for later access and use.

The local processing & data module 140 and/or the remote processing module 150 may be configured to identify the location from the sensor information; access the information from the data repository on the location and other characteristics of the light sources (e.g., size, shape, brightness, color etc.) as well as potentially how the light transmission capability of different portions of the display lens 106 that appear to be aligned with different ambient light sources at that location should be changed for that particular time of day and year. This information can be used to direct the stimulus providing sources to activate the variable optical materials in various portions of the display lens to change the intensity, spectral content and/or direction of ambient light in accordance with the predetermined information.

This can advantageously save processing time. For example, information (e.g., location, intensity, spectral content, etc.) about various ambient light sources (e.g., lamps, windows, over head lights, etc.) in a user's home or office can be stored in the data repository. Information regarding the location of the sun, the direction of sunlight at various time of the day can also be stored in the data repository. When the system 60 detects from the information obtained by the sensors that the user is in the office or home, the local processing & data module 140 and/or the remote processing module 150 can send appropriate signals to the various stimulus providing sources to darken and/or lighten various portions of the display lens 70 based on the stored information (e.g., location, intensity, spectral content, etc.) about various ambient light sources in the user's home or office.

Figure 10:
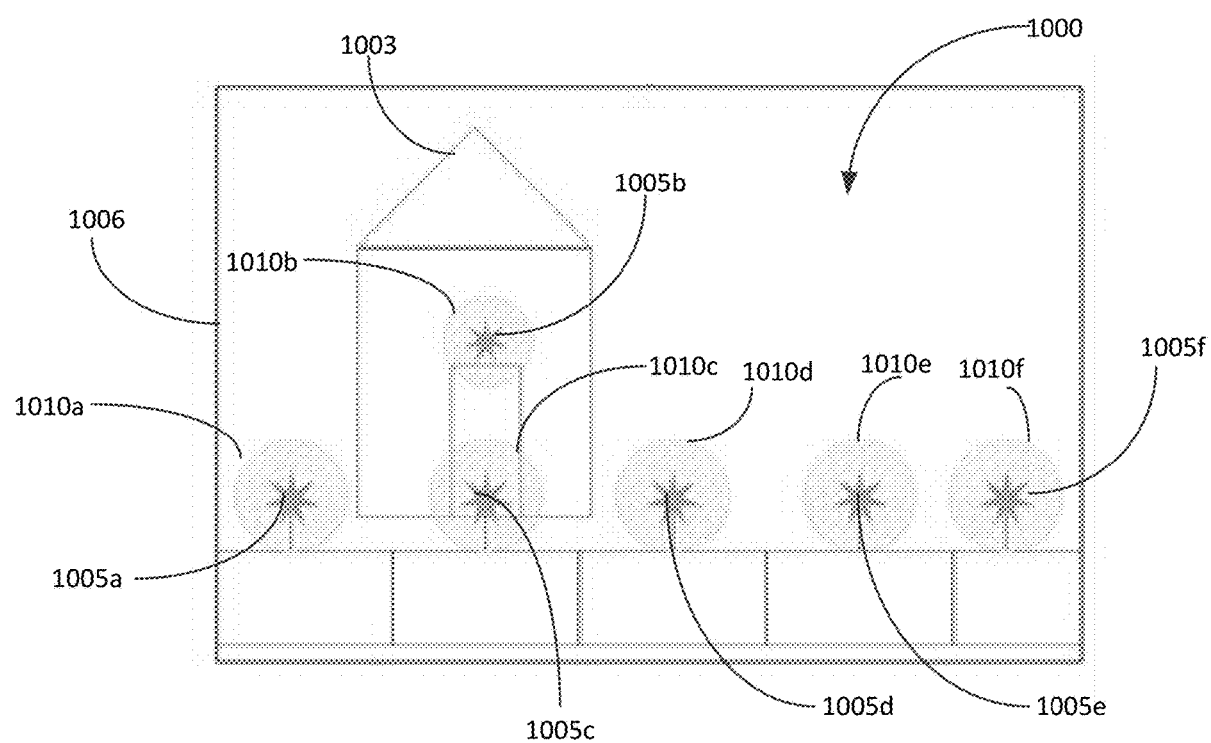
FIG. 10 illustrates a scene including one or more sources of ambient light.

FIG. 10 illustrates a scene 1000 viewed by a user during nighttime through a display lens 1006 of an embodiment of a display system. The display system can have features similar to the display system 60 discussed above. For example, the display system can include one or more sensors configured to obtain information of the scenes, the information including position of the various ambient light sources with respect to the display lens 1006, the brightness of the various ambient light sources and/or the type of the various ambient light sources (e.g., fluorescent light, LED light, incandescent light, etc.). The display system can also include electronic processing systems configured to process the information obtained by the one or more sensors. Processing the information obtained by the one or more sensors can include identifying the portions of the display lens 1006 that appear to be aligned with (or coincide with) the various ambient light sources in the scene 1000 viewed by the user and to determine the light transmission characteristic of one or more portions of the display lens 1006 to improve/maintain the user's visual experience. The display lens 1006 comprises one or more variable optical materials that are configured to change the intensity of incident ambient light, spectral content of incident ambient light and/or direction of incident ambient light in response to an optical, electrical, thermal and/or sonic/ultrasonic stimulus provided by the display system. The display lens 1006 can have features similar to the display lens 106. The scene 1000 includes a front porch of a house 1003 and several sources of ambient light 1005*a*, 1005*b*, 1005*c*, 1005*d*, 1005*e* and 1005*f* along a sidewalk. The sources of ambient light 1005*a*-1005*f* can include porch lights, street lights, indoor lights, outdoor lights, path lights, landscape lighting, etc. In embodiments of display lenses without one or more variable optical materials, the sources of ambient light 1005*a*-1005*f* can produce glare and/or degrade the clarity of vision when viewed through the portions of the display lenses that appear to be aligned with the sources of ambient light 1005*a*-1005*f*. In contrast, the display lens 1006 is configured to change the intensity of ambient light, spectral content of the ambient light and/or direction of the ambient light incident on the display lens 1006 through the portions of the display lens 1006 that appear to be aligned with the sources of ambient light 1005*a*-1005*f* to reduce interference with the user experience due to glare resulting from the ambient light 1005*a*-1005*f*.

As discussed above, the sensors associated with the display system can continuously or intermittently obtain information of the scene 1000. The information can include position of the ambient light sources 1005*a*-1005*f* with respect to the display lens 1006, the direction, intensity and spectral content of ambient light from the ambient light sources 1005*a*-1005*f*. The electronic processing systems can process the information obtained by the one or more sensors, determine how the distribution of ambient light across the surface of the display lens 1006 should be changed. For example, in some embodiments, the electronic processing systems can determine that an area of the display lens 1006 (e.g., 1010*a*, 1010*b*, 1010*c*, 1010*d*, 1010*e* and 1010*f*) including the portion of the scene including the ambient light sources 1005*a*-1005*f* should be darkened to reduce the intensity of ambient light transmitted through those portions. As another example, in some embodiments, the electronic processing systems can determine that the incident ambient light in an area of the display lens 1006 (e.g., 1010*a*, 1010*b*, 1010*c*, 1010*d*, 1010*e* and 1010*f*) including the portion of the scene including the ambient light sources 1005*a*-1005*f* should be diffused to reduce glare. As another example, in some embodiments, the electronic processing systems can determine that the incident ambient light in an area of the display lens 1006 (e.g., 1010*a*, 1010*b*, 1010*c*, 1010*d*, 1010*e* and 1010*f*) including the ambient light sources 1005*a*-1005*f* should be redirected to reduce glare.

Based on the determination, the electrical processing system can send signals to activate the optical, thermal, sonic/ultrasonic and/or electrical source associated with the display system and provide a desired optical, thermal, sonic/ultrasonic and/or electrical stimulus to the area of the display lens 1006 (e.g., 1010*a*, 1010*b*, 1010*c*, 1010*d*, 1010*e* and 1010*f*) including the ambient light sources 1005*a*-1005*f* that causes a physical and/or chemical change to the variable optical materials in that area of the display lens which in turn can change intensity of incident ambient light, spectral content of incident ambient light and/or direction of incident ambient light.

In various embodiments, the system 60 may be configured to track the movement of the user's eyes and/or head in real time or in near real time and determine the relative position between real world objects (e.g., trees, sun, ambient light sources, etc.) and the user's eyes in real time or in near real time. In such embodiments, the system 60 may be configured to dynamically change the ambient light transmission characteristics through different portions of the display lens as the user's head and/or eyes move, e.g., to maintain/improve the user's visual experience. For example, consider the user's head is in a first position and the ambient light source appears to be aligned with a portion of the display lens 106 to the left of the left eye pupil of the user. If the user remains in the first head position, the portion of the display lens 106 that is to the left of the left eye pupil may be darkened or otherwise altered to reduce intensity of ambient light transmitted through that portion. As the user's head moves to the left to a second position, the ambient light source may now appear to be aligned with a portion of the display lens 106 that is to the right of the left eye pupil. Accordingly, when the user's head is in the second position, the portion of the display lens 106 that is to the right of the left eye pupil may be darkened or otherwise altered to reduce intensity of ambient light transmitted through that portion to maintain the user's visual experience. The portion of the display lens 106 that is to the left of the left eye pupil that was previously darkened when the head was in the first position may be lightened or remain in the darkened state. A sensor such as an outward facing camera that images the field in front of the eyewear and that can provide mapping of the location of the objects including bright light sources in the field of view of the sensor with respect to the lenses and the users eye, can be used to determine the portions of the lens that are to be altered, for example, to attenuate light from bright objects the produce glare. Similarly, a database that includes a record of the location of objects and, for example, their brightness, may also be used in determining the portion of the lens that is to be altered, for example, to attenuate light from bright objects that produce glare. A head pose sensor and/or system may be used to determine the movement, position, and/or orientation of the head and/or body. This position may be used in conjunction with the database of locations of objects to determine the position of the object with respect to the user's eye, the lens, and to determine the portion(s) of the lens aligned with the object(s) as well as the portion(s) of the lens that are to be altered.

FIG. 11 illustrates a flowchart 1100 that depicts a method of altering ambient light transmission characteristics through a display device that would improve a user's visual experience when using an embodiment of a display system 60. The method includes obtaining information regarding position of various ambient light sources and/or glare producing objects in a scene viewed by the user through the display device using one or more sensors as shown in block 1105. For example, the one or more light sensors 128, the outward facing camera(s) 112 and/or other sensor assemblies of the display system 60 can be configured to obtain information regarding the location and the nature of various ambient light sources and/or glare producing objects in a scene viewed by the user. The information obtained by the one or more light sensors 128, the outward facing camera(s) 112 and/or other sensor assemblies of the display system 60 can include the spectral characteristics of ambient light and/or other characteristics of ambient light (e.g., intensity of the ambient light). As another example, one or more light sensors 128, the outward facing camera(s) 112 and/or other sensor assemblies of the display system 60 can be configured to obtain information about the location of objects, areas, or regions of the forward field of view that are bright and one or more areas or regions of the forward field of view that are dark. As yet another example, one or more light sensors 128, the outward facing camera(s) 112 and/or other sensor assemblies of the display system 60 can be configured to obtain location of one or more bright ambient light sources and the intensity of light from the bright ambient light sources and the intensity of light. The information obtained by the one or more sensor assemblies is transmitted to one or more electronic processing systems (e.g., the local processing & data module 140 and/or the remote processing module 150) for processing. The electronic processing systems can be local or remote. The one or more electronic processing systems can process the information obtained by the one or more sensor assemblies and determine characteristics of the ambient light at one or more locations of the display lens 106, as shown in block 1107. The determined characteristics can include the intensity of ambient light at one or more locations of the display lens 106 and/or the spectral characteristics of ambient light at one or more locations of the display lens 106. In some embodiments, the one or more electronic processing systems can also be configured to determine whether the source of ambient light is the sun, a fluorescent light source, an LED light source, or a combination of these light sources. Additionally, as shown in block 1107, the one or more electronic processing systems can be configured to identify portions of the display lens that appear to be aligned with the various ambient light sources and/or glare producing objects in the scene viewed by the user through the display lens. The one or more electronic processing systems can determine ambient light transmission characteristics at one or more locations of the display lens 106 that will improve a user's visual experience based on the determined portions of the display lens 106 that coincide with the various ambient light sources and/or glare producing objects, the intensity and/or spectral characteristic of the various ambient light source and/or glare producing objects, as shown in block 1109.

For example, the one or more electronic processing systems can determine the amount by which the one or more locations of the display lens 106 should be darkened to improve user's visual experience. As another example, based on the determination that ambient light is from a setting sun, the one or more electronic processing systems can determine that altering the transmission characteristics of the portion of the display lens 106 that is aligned with the sun as seen by the eye can reduce glare caused by the sun. Similarly, reducing the amount of light in one or more wavelengths (e.g., red wavelengths) of the received light that is transmitted through the portion of the display lens 106 that is aligned with the sun as seen by the eye can reduce glare and possibly improve user's visual experience.

The one or more electronic processing systems can send signals to trigger or cause one or more stimulus providing sources associated with the display system 60 to alter the ambient light transmission characteristics at one or more locations of the display lens 106 in accordance with the determination made by the one or more electronic processing systems, as shown in block 1111. For example, the one or more electronic processing systems can send signals to turn on one or more of the optical, electrical, thermal and/or sonic/ultrasonic sources associated with the display system 60 and provide an optical, electrical, thermal and/or sonic/ultrasonic signal to change the physical/chemical characteristics of the molecules of the variable optical material in at least a portion of the display lens 106 to alter the light ambient transmission characteristic of that portion. As another example, the one or more electronic processing systems can send signals to turn on or otherwise cause an optical source or system associated with the display system 60 to provide an optical signal to change the physical/chemical characteristics of the molecules of the variable optical material in at least a portion of the display lens 106 to alter the light ambient transmission characteristic of that portion. The optical signal can be of predetermined intensity and wavelength. For example, the optical signal can be a beam of visible or invisible light of a certain wavelength. The molecules of the variable optical material can, for example, expand, shrink, move, twist or rotate in response to the stimulus provided by the signal from the optical, electrical, thermal and/or sonic/ultrasonic sources associated with the display system 60 and provide the desired ambient light altering characteristic (e.g., attenuation in one or more wavelength regions, light deflection, diffusion, etc.).

Figure 12C:
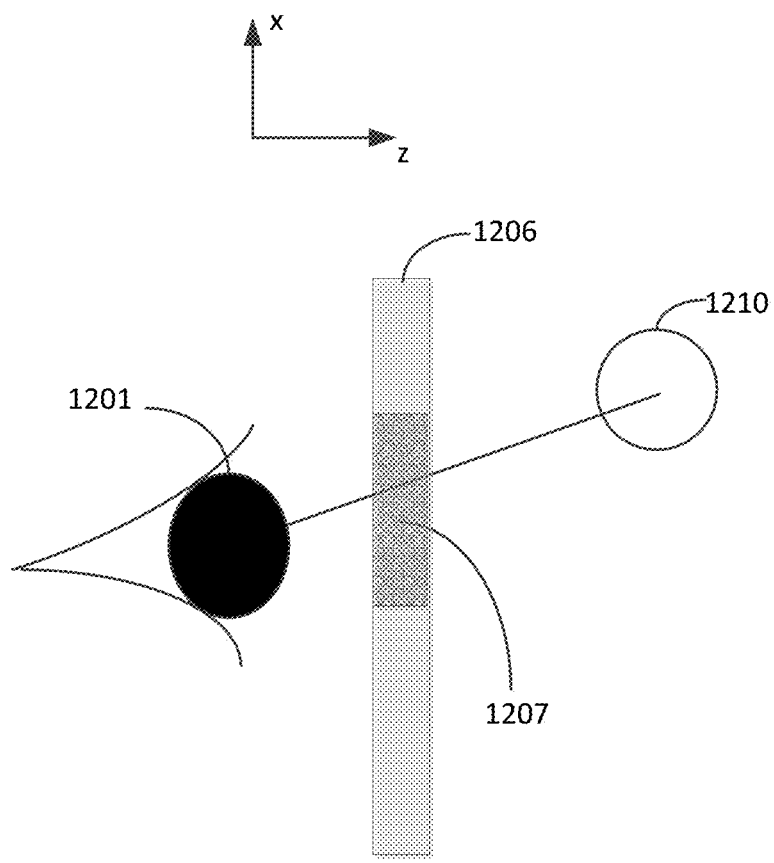
FIG. 12C is a top view of the display lens illustrated in FIG. 12A.

FIG. 12A schematically illustrates a side view of a display lens 1206 disposed forward of a user's eye 1201. FIG. 12B schematically illustrates a front view of the display lens 1206 as seen from a side opposite the eye side. FIG. 12C schematically illustrates a top view of the display lens 1206. An ambient light source 1210 in the scene viewed by the user through the display lens 1206 appears to be aligned with a region 1207 of the display lens 1206. As illustrated in FIGS. 12A-12C, the ambient light source 1210 appears to be aligned with the region 1207 of the display lens 1206 in both x- & y-directions. Similarly, the region 1207 of the display lens 1206 appears to be aligned with the light source 1210 as seen by the user's eye in both x- & y-directions. As discussed in this application, an electronic processing system associated with the display lens 1206 can be configured to alter/modify the transmission of ambient light through the region 1207 of the display lens 1206 to improve the user's visual experience. For example, in some embodiments, the region 1207 can be darkened as compared to other portions of the display lens 1206 to reduce the intensity of ambient light transmitted through that region. In some other embodiments, ambient light incident through the region 1207 may be directed away from the user's eye 1201. Other characteristics of the display may be altered.

Various studies can be performed to characterize the light altering characteristics of the variable optical material. Different studies can also be performed to characterize the type of light alteration that will result in a desired user experience for different types of ambient light sources. For example, different embodiments of the display system 60 can be tested prior to being used by a user to characterize the light altering characteristics of the variable optical material. The tests can include an analysis of the stimulus strength that would be required to achieve a certain alteration in a desired portion of the display 70 or the display lens 106, the time interval between providing the stimulus and achieving the alteration in the desired portion of the display 70, the alteration that would provide an improved visual experience for an average user for different ambient light sources, etc. The results of the various studies can be stored in a database accessible by the local processing & data module 140 and/or the remote processing module 150. The local processing & data module 140 and/or the remote processing module 150 can access the results of the various studies when determining the nature of light altering capability of a certain portion of the display lens and the signals to send to various stimulus providing sources.

In various embodiments, the display system 60 can be configured to obtain feedback from the user regarding the size and/or location of the portions of the display 70 and/or the display lens 106 that have altered light transmission capability and the extent to which the light transmission should be altered in various portions of the display 70 and/or the display lens 106 to improve the user's visual experience. In such embodiments, the local processing & data module 140 and/or the remote processing module 150 can make an initial determination of the size and/or location of the portions of the display 70 and/or the display lens 106 that have altered light transmission capability based on the information obtained from the various sensors and/or the imaging systems associated with the system 60. The local processing & data module 140 and/or the remote processing module 150 can also make an initial determination of the extent to which light transmission through various portions of the display 70 and/or the display lens 106 should be altered based on the results of the initial tests and studies. The system 60 can then prompt the user using visual and/or aural signals and request feedback from the user regarding the size and/or location of the portions of the display 70 and/or the display lens 106 that have altered ambient light transmission and the extent to which light transmission is altered through the various portions. The local processing & data module 140 and/or the remote processing module 150 can adjust the size and/or location of the portions of the display 70 and/or the display lens 106 that have altered light transmission capability and the extent to which the light transmission should be altered in various portions of the display 70 and/or the display lens 106 based on feedback from the user. In this way, the visual experience can be improved based on a user's preference. The user can provide feedback in a variety of ways. For example, the user can provide feedback using voice commands. As another example, the user can use one or more buttons or knobs, a joystick, a touch pad or a track ball to provide feedback. As yet another example, the user can use gestures (e.g., hand gestures, facial gestures, blink responses, etc.) to provide feedback. An example of a display device configured to adjust size and/or location of the portions of the display 70 and/or the display lens 106 that have altered light transmission capability and the extent to which the light transmission should be altered in various portions of the display 70 and/or the display lens 106 based on feedback from the user is discussed below.

Consider an embodiment of a display system that determines one or more portions of the display lens that appear to be aligned with one or more ambient light sources in a scene viewed by the user through the display lens. In response to the determination, the system can be configured to darken the one or more portions of the display lens that appear to be aligned with one or more ambient light sources in the scene. The system can then request feedback from the user regarding the size and/or locations of the one or more darkened portions of the display lens and the amount of darkening in those portions. The user can provide feedback that the system can use to adjust the size and/or locations of the one or more darkened portions of the display lens and the amount of darkening in those portions.

The variable optical materials discussed herein can be configured to act as a filter that filter-out specific wavelengths of incoming light such as, for example, blue light, red light, green light or some other wavelength of light to enhance user experience. In various embodiments, the variable optical materials can be configured to direct incoming light towards or away from specific regions of the eye. In such embodiment, the inward facing cameras 114 can be used to track movements of the eye and the chemical/physical properties of the variable optical materials can be controlled by providing stimulus from the system 60 such that incoming light remains directed towards or away from specific regions of the eye despite movements of the eye. In various embodiments, the variable optical materials can be configured to partially or completely attenuate incoming light from an environment (e.g., to prevent sensory overload in certain environments).

Although attenuation, diffusion, refraction, redirection, filtering and/or scattering of ambient light through a portion of the display lens 106 is discussed above, in any such case, in certain embodiments different lenses can attenuate, diffuse, refract, redirect, filter and/or scatter incident ambient light. For example, left and right lenses can attenuate, diffuse, refract, redirect, filter and/or scatter incident ambient light by different amounts. Additionally different portions of the left and right lenses can attenuate, diffuse, refract, redirect, filter and/or scatter incident ambient light differently. Direct control over the degree of attenuation and the portions of the lenses that are attenuated enables different portions of the left and right lenses that have different shapes and/or sizes to be attenuated as well as different magnitudes and distributions of attenuation. Other characteristics such as spectral characteristics of the left and right lenses and the attenuation thereof can be different.

It is contemplated that various embodiments may be implemented in or associated with a variety of applications such as imaging systems and devices, display systems and devices, spatial light modulators, liquid crystal based devices, polarizers, wave guide plates, etc. The structures, devices and methods described herein may particularly find use in displays such as wearable displays (e.g., head mounted displays) that can be used for augmented and/or virtually reality. More generally, the described embodiments may be implemented in any device, apparatus, or system that can be configured to display an image, whether in motion (such as video) or stationary (such as still images), and whether textual, graphical or pictorial. It is contemplated, however, that the described embodiments may be included in or associated with a variety of electronic devices such as, but not limited to: mobile telephones, multimedia Internet enabled cellular telephones, mobile television receivers, wireless devices, smartphones, Bluetooth® devices, personal data assistants (PDAs), wireless electronic mail receivers, hand-held or portable computers, netbooks, notebooks, smartbooks, tablets, printers, copiers, scanners, facsimile devices, global positioning system (GPS) receivers/navigators, cameras, digital media players (such as MP3 players), camcorders, game consoles, wrist watches, clocks, calculators, television monitors, flat panel displays, electronic reading devices (e.g., e-readers), computer monitors, auto displays (including odometer and speedometer displays, etc.), cockpit controls and/or displays, camera view displays (such as the display of a rear view camera in a vehicle), electronic photographs, electronic billboards or signs, projectors, architectural structures, microwaves, refrigerators, stereo systems, cassette recorders or players, DVD players, CD players, VCRs, radios, portable memory chips, washers, dryers, washer/dryers, parking meters, head mounted displays and a variety of imaging systems. Thus, the teachings are not intended to be limited to the embodiments depicted solely in the Figures, but instead have wide applicability as will be readily apparent to one having ordinary skill in the art.

Various modifications to the embodiments described in this disclosure may be readily apparent to those skilled in the art, and the generic principles defined herein may be applied to other embodiments without departing from the spirit or scope of this disclosure. Various changes may be made to the invention described and equivalents may be substituted without departing from the true spirit and scope of the invention. In addition, many modifications may be made to adapt a particular situation, material, composition of matter, process, process act(s) or step(s) to the objective(s), spirit or scope of the present invention. All such modifications are intended to be within the scope of claims associated with this disclosure.

The word "exemplary" is used exclusively herein to mean "serving as an example, instance, or illustration." Any embodiment described herein as "exemplary" is not necessarily to be construed as preferred or advantageous over other embodiments. Additionally, a person having ordinary skill in the art will readily appreciate, the terms "upper" and "lower", "above" and "below", etc., are sometimes used for ease of describing the figures, and indicate relative positions corresponding to the orientation of the figure on a properly oriented page, and may not reflect the orientation of the structures described herein, as those structures are implemented.

Certain features that are described in this specification in the context of separate embodiments also can be implemented in combination in a single embodiment. Conversely, various features that are described in the context of a single embodiment also can be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products. Additionally, other embodiments are within the scope of the following claims. In some cases, the actions recited in the claims can be performed in a different order and still achieve desirable results.

The invention includes methods that may be performed using the subject devices. The methods may comprise the act of providing such a suitable device. Such provision may be performed by the end user. In other words, the "providing" act merely requires the end user obtain, access, approach, position, set-up, activate, power-up or otherwise act to provide the requisite device in the subject method. Methods recited herein may be carried out in any order of the recited events which is logically possible, as well as in the recited order of events.

Example aspects of the invention, together with details regarding material selection and manufacture have been set forth above. As for other details of the present invention, these may be appreciated in connection with the above-referenced patents and publications as well as generally known or appreciated by those with skill in the art. The same may hold true with respect to method-based aspects of the invention in terms of additional acts as commonly or logically employed.

In addition, though the invention has been described in reference to several examples optionally incorporating various features, the invention is not to be limited to that which is described or indicated as contemplated with respect to each variation of the invention. Various changes may be made to the invention described and equivalents (whether recited herein or not included for the sake of some brevity) may be substituted without departing from the true spirit and scope of the invention. In addition, where a range of values is provided, it is understood that every intervening value, between the upper and lower limit of that range and any other stated or intervening value in that stated range, is encompassed within the invention.

Also, it is contemplated that any optional feature of the inventive variations described may be set forth and claimed independently, or in combination with any one or more of the features described herein. Reference to a singular item, includes the possibility that there are plural of the same items present. More specifically, as used herein and in claims associated hereto, the singular forms "a," "an," "said," and "the" include plural referents unless the specifically stated otherwise. In other words, use of the articles allow for "at least one" of the subject item in the description above as well as claims associated with this disclosure. It is further noted that such claims may be drafted to exclude any optional element. As such, this statement is intended to serve as antecedent basis for use of such exclusive terminology as "solely," "only" and the like in connection with the recitation of claim elements, or use of a "negative" limitation.

Without the use of such exclusive terminology, the term "comprising" in claims associated with this disclosure shall allow for the inclusion of any additional element—irrespective of whether a given number of elements are enumerated in such claims, or the addition of a feature could be regarded as transforming the nature of an element set forth in such claims. Except as specifically defined herein, all technical and scientific terms used herein are to be given as broad a commonly understood meaning as possible while maintaining claim validity.

The breadth of the present invention is not to be limited to the examples provided and/or the subject specification, but rather only by the scope of claim language associated with this disclosure.

What is claimed is:

1. A user-wearable display device comprising:
   a frame configured to mount on the user;
   an augmented reality display attached to the frame and configured to direct images to an eye of the user and to provide a first field of view of an environment surrounding the user;
   one or more sensors configured to obtain information about an ambient light condition in the environment surrounding the user, at least one of the one or more sensors being an image capture device with a second field of view of the environment surrounding the user, wherein the second field of view is offset from the first field of view;
   a variable optical material that undergoes a physical and/or a chemical change in response to a stimulus;
   a source configured to provide the stimulus; and
   processing electronics configured to:
      trigger the source to provide the stimulus to the variable optical material to effect a physical and/or a chemical change in the material at a location selected based on the information obtained by the one or more sensors and on a relationship between the first field of view of the augmented reality display and the second field of view of the image capture device such that at least one of intensity of ambient light, spectral content of ambient light, or direction of ambient light is changed.

2. The user-wearable device of claim 1, wherein the augmented reality display comprises a waveguide configured to:
   allow a view of the environment surrounding the user through the waveguide; and
   form images by directing light out of the waveguide and into an eye of the user.

3. The user-wearable device of claim 2, wherein the waveguide is part of a stack of waveguides, wherein each waveguide of the stack is configured to output light with different amounts of divergence in comparison to one or more other waveguides of the stack of waveguides.

4. The user-wearable device of claim 1, wherein the one or more sensors further comprise a global positioning subsystem or an environmental sensor.

5. The user-wearable device of claim 1, further comprising another image capture device configured to track movement of eyes of the user.

6. The user-wearable device of claim 1, further comprising a light source configured to generate a projection beam based on data associated with the images directed to the eye of the user.

7. The user-wearable device of claim 1, wherein the source comprises an optical source configured to direct visible or invisible light to one or more portions of the display.

8. The user-wearable device of claim 1, wherein the source comprises an electrical source configured to provide an electrical signal to one or more portions of the display.

9. The user-wearable device of claim 1, wherein the source comprises a thermal source configured to provide a thermal radiation to one or more portions of the display.

10. The user-wearable device of claim 1, wherein the source comprises a sonic/ultrasonic system configured to provide sonic/ultrasonic energy to one or more portions of the display.

11. The user-wearable device of claim 1, wherein the variable optical material is embedded in a surface of the display.

12. The user-wearable device of claim 1, wherein the variable optical material is disposed over a surface of the display.

13. The user-wearable device of claim 1, wherein the variable optical material includes organic or inorganic compounds.

14. The user-wearable device of claim 1, wherein the variable optical material comprises electroactive proteins.

15. The user-wearable device of claim 1, wherein the variable optical material comprises molecules that exhibit a change in size or shape in response to the stimulus.

16. The user-wearable device of claim 1, wherein the variable optical material comprises molecules that move, rotate, twist, or shift in response to the stimulus.

17. The user-wearable device of claim 1, wherein the variable optical material comprises molecules that move together and/or adhere together in response to the stimulus.

18. The user-wearable device of claim 1, wherein the variable light optical material comprises molecules that move away from each other in response to the stimulus.

19. The user-wearable device of claim 1, wherein the variable optical material comprises molecules that form nanostructures in response to the stimulus.

20. The user-wearable device of claim 1, wherein the display comprises a first ocular region corresponding to a first eye of the user and a second ocular region corresponding to a second eye of the user, and
   wherein the processing electronics are configured to trigger the source to provide the stimulus to a portion of the display to effect a physical and/or a chemical change in the variable optical material based on the information obtained by the one or more sensors such that at least one of intensity of ambient light, spectral content of ambient light, or direction of ambient light is changed through the first ocular region as a result of stimulus from a source triggered by the processing electronics.

21. The user-wearable device of claim 1, wherein the display comprises a first ocular region corresponding to a first eye of the user and a second ocular region corresponding to a second eye of the user, and
wherein the processing electronics are configured to trigger the source to provide the stimulus to a portion of the display to effect a physical and/or a chemical change in the material based on the information obtained by the one or more sensors such that at least one of intensity of ambient light, spectral content of ambient light, or direction of ambient light through the first ocular region is changed differently as compared to intensity of ambient light, spectral content of ambient light, or direction of ambient light through the second ocular region.

22. The user-wearable device of claim 1, wherein the processing electronics are configured to trigger the source to provide the stimulus to the display to effect a physical and/or a chemical change in the material based on the information obtained by the one or more sensors such that attenuation of intensity of ambient light transmitted through a first portion of the display is greater than attenuation of intensity of ambient light transmitted through a second portion of the display.

23. The user-wearable device of claim 22, wherein the intensity of ambient light incident on the first portion of the display is greater than intensity of ambient light incident on the second portion of the display.

24. The user-wearable device of claim 22, wherein the processing electronics are configured to trigger the source to provide the stimulus to the display to effect a physical and/or a chemical change in the material based on the information obtained by the one or more sensors such that the intensity of ambient light transmitted through the second portion of the display is reduced.

25. The user-wearable device of claim 1, wherein the display comprises a first ocular region corresponding to a first eye of the user and a second ocular region corresponding to a second eye of the user, and
wherein the processing electronics are configured to trigger the source to provide the stimulus to the display to effect a physical and/or a chemical change in the material based on the information obtained by the one or more sensors such that intensity of ambient light transmitted through a portion of the first ocular region is reduced.

26. The user-wearable device of claim 1, wherein the processing electronics are configured to trigger the source to provide the stimulus to the display to effect a physical and/or a chemical change in the material based on the information obtained by the one or more sensors such that the spectrum of ambient light transmitted through a first portion of the display is different than the spectrum of ambient light transmitted through a second portion of the display.

27. The user-wearable device of claim 1, wherein the display comprises a first lens corresponding to a first eye of the user and a second lens corresponding to a second eye of the user, and
wherein the processing electronics are configured to trigger the source to provide the stimulus to the display to effect a physical and/or a chemical change in the variable optical material associated with the first lens based on the information obtained by the one or more sensors such that intensity of ambient light transmitted through only the first lens is reduced as a result of stimulus from a source triggered by the processing electronics.

28. The user-wearable device of claim 1, wherein the display comprises a first lens corresponding to a first eye of the user and a second lens corresponding to a second eye of the user, and
wherein the processing electronics are configured to trigger the source to provide the stimulus to the display to effect a physical and/or a chemical change in the variable optical material associated with the first lens based on the information obtained by the one or more sensors such that intensity of ambient light transmitted through a portion of the first lens is reduced by an amount greater than another portion of the first lens.

29. The user-wearable device of claim 28, wherein the processing electronics are configured to trigger the source to provide the stimulus to the display to effect a physical and/or a chemical change in the variable optical material associated with the second lens based on the information obtained by the one or more sensors such that intensity of ambient light transmitted through a portion of the second lens is reduced.

30. The user-wearable device of claim 1, wherein the display comprises a first lens corresponding to a first eye of the user and a second lens corresponding to a second eye of the user, and
wherein the processing electronics are configured to trigger the source to provide the stimulus to the display to effect a physical and/or a chemical change in the variable optical material associated with the first lens based on the information obtained by the one or more sensors such that intensity of ambient light transmitted through the first lens is attenuated more than through the second lens.

31. The user-wearable device of claim 30, wherein the processing electronics are configured to trigger the source to provide the stimulus to the display to effect a physical and/or a chemical change in the variable optical material associated with the second lens based on the information obtained by the one or more sensors such that intensity of ambient light transmitted through the second lens is reduced.

32. The user-wearable device of claim 1, wherein the display comprises a first lens corresponding to a first eye of the user and a second lens corresponding to a second eye of the user, and
wherein the processing electronics are configured to trigger the source to provide the stimulus to the display to effect a physical and/or a chemical change in variable optical material associated with the first or second lens based on the information obtained by the one or more sensors such that spectrum of ambient light transmitted through the first and second lenses is different.

33. The user-wearable device of claim 1, wherein the display comprises a first lens corresponding to a first eye of the user and a second lens corresponding to a second eye of the user, and
wherein the processing electronics are configured to trigger the source to provide the stimulus to the display to effect a physical and/or a chemical change in the variable optical material associated with the first or second lens based on the information obtained by the one or more sensors such that the spectrum of ambient light transmitted through a portion of the first lenses is different than another portion of the first lens.

34. The user-wearable device of claim 33, wherein the display comprises a first lens corresponding to a first eye of the user and a second lens corresponding to a second eye of the user, and wherein the processing electronics are configured to trigger the source to provide the stimulus to the display to effect a physical and/or a chemical change in the variable optical material associated with the first or second lens based on the information obtained by the one or more sensors such that the spectrum of ambient light transmitted through a portion of the first lenses is different than another portion of the second lens.

35. The user-wearable device of claim 1, wherein an object as seen by the wearer's eye through the display appears to be aligned with at least one portion of the display, and wherein the processing electronics are configured to cause the source to provide the stimulus to the at least one portion of the display for which the object appears to be aligned to effect a physical and/or a chemical change in the variable optical material such that at least one of intensity of light from said object, spectral content of said light from said object or direction of said light from said object is changed.

36. The user-wearable device of claim 35, wherein the processing electronics are configured to determine the at least one portion of the display for which the object appears to be aligned based on the movement of the user's head as tracked by said one or more sensors.

37. The user-wearable device of claim 35, wherein the processing electronics are configured to cause the source to provide the stimulus to the at least one portion of the display to effect a physical and/or a chemical change in the variable optical material such that the intensity of ambient light reduced.

38. The user-wearable device of claim 1, further comprising a head pose sensor.

39. The user-wearable device of claim 1, further configured to adjust the location of the at least one portion of the display through which at least one of intensity of ambient light, spectral content of ambient light, or direction of ambient light is changed based on feedback from the user.

40. The user-wearable device of claim 1, further configured to adjust the size of the at least one portion of the display through which at least one of intensity of ambient light, spectral content of ambient light, or direction of ambient light is changed based on feedback from the user.

41. The user-wearable device of claim 1, further configured to adjust the amount by which at least one of intensity of ambient light, spectral content of ambient light, or direction of ambient light is changed based on feedback from the user.

42. The user-wearable device of claim 1, wherein the variable optical material is distributed unevenly across a surface of the display.

43. The user-wearable device of claim 42, wherein a first portion of the display has a higher density of the variable optical material than a second portion of the display.

44. The user-wearable device of claim 1, wherein the variable optical material comprises a first layer of a first variable optical material and a second layer of a second variable optical material.

45. The user-wearable device of claim 44, wherein the first variable optical material acts on different wavelengths of the ambient light than the second variable optical material.

46. The user-wearable device of claim 1, wherein the variable optical material is provided in an add-on device that can be removably attached to the display.

47. The user-wearable device of claim 1, wherein the device is configured to:

determine the user's position in the environment; and provide the stimulus based on the user's position in the environment.

48. The user-wearable device of claim 47, wherein the device is further configured to:

store one or more locations of ambient light sources in the environment; and provide the stimulus based on the user's position relative to the one or more stored locations of ambient light sources.

49. The user-wearable device of claim 48, wherein the device is further configured to provide the stimulus based on the time of day.

50. The user-wearable device of claim 1, wherein the variable optical material is configured to diffract, refract, or diffuse the ambient light.

51. The user-wearable device of claim 1, wherein the device is configured to select the location for the stimulus based on a relatively bright source of ambient light detected by the one or more sensors, wherein the relatively bright source of ambient light is determined by dividing the one or more sensors into a plurality of pixel groups and determining an average brightness for each of the pixel groups.

52. A method of manipulating light transmitted through a user-wearable display device with a first field of view of an environment surrounding the user, the display device comprising a display surface including a variable optical material that varies at least one of intensity of ambient light, spectral content of ambient light, or direction of ambient light transmitted through the display surface in response to a stimulus, the method comprising:

obtaining one or more measurements about an ambient light condition in the environment surrounding the user using one or more sensors, at least one of the one or more sensors being an image capture device with a second field of view of the environment surrounding the user, wherein the second field of view is offset from the first field of view; and controlling a source to provide a stimulus to the display surface to effect a physical and/or chemical change in the material at a location selected based on the one or more measurements obtained by the one or more sensors and on a relationship between the first field of view of the display device and the second field of view of the image capture device such that at least one of intensity of ambient light, spectral content of ambient light, or direction of ambient light transmitted through the display surface is changed.

* * * * *